United States Patent [19]

Sawada et al.

[11] Patent Number: 5,083,170
[45] Date of Patent: Jan. 21, 1992

[54] ELECTROPHOTOGRAPHIC RECORDING APPARATUS

[75] Inventors: Shigeru Sawada; Mitsuaki Maruyama; Kenji Sawada; Hitoshi Nakagawa; Jun Tsujimoto; Shinichi Kasai; Masahiko Takeshita; Satoshi Kaneta; Masahiro Koiwai; Hiroshi Niki, all of Nagano, Japan

[73] Assignee: Seiko Epson Corporation, Tokyo, Japan

[21] Appl. No.: 508,713

[22] Filed: Apr. 16, 1990

[30] Foreign Application Priority Data

| Apr. 14, 1989 | [JP] | Japan | 1-95005 |
| May 2, 1989 | [JP] | Japan | 1-113076 |
| Jun. 22, 1989 | [JP] | Japan | 1-161847 |
| Jun. 29, 1989 | [JP] | Japan | 1-167381 |

[51] Int. Cl.$^5$ .................................... G03G 21/00
[52] U.S. Cl. .................. 355/319; 271/3.1; 346/160.1; 355/200; 355/318
[58] Field of Search ............... 355/308, 318, 319, 321, 355/309; 271/3, 3.1, 301, 65, 186; 346/160, 160.1

[56] References Cited

U.S. PATENT DOCUMENTS

| 3,661,383 | 5/1972 | Morrison | 271/301 X |
| 4,692,020 | 9/1987 | Tsujihara | 355/319 |
| 4,750,016 | 6/1988 | Kusumoto et al. | 355/318 X |
| 4,754,293 | 6/1988 | Aizawa et al. | 271/186 X |
| 4,787,616 | 11/1988 | Sasaki et al. | 271/3.1 |
| 4,825,245 | 4/1989 | Fukae et al. | 355/319 |
| 4,854,757 | 8/1989 | Kikuchi | 271/3 |
| 4,918,490 | 4/1990 | Stemmle | 355/318 |
| 4,928,129 | 5/1990 | Honda | 346/160 |
| 4,941,002 | 7/1990 | Maruyama et al. | 346/160 |
| 4,945,364 | 7/1990 | Maruyama et al. | 346/160 |
| 4,945,390 | 7/1990 | Hasegawa et al. | 355/321 |
| 4,974,033 | 11/1990 | Yamada et al. | 355/319 |

FOREIGN PATENT DOCUMENTS

| 0240337 | 10/1987 | European Pat. Off. . |
| 0358220 | 3/1990 | European Pat. Off. . |
| 1-76073 | 3/1989 | Japan . |
| 1-70953 | 7/1989 | Japan . |

Primary Examiner—A. T. Grimley
Assistant Examiner—Nestor R. Ramirez
Attorney, Agent, or Firm—Cushman, Darby & Cushman

[57] ABSTRACT

An electrophotographic recording apparatus comprising these units which are arranged vertically: a sheet feeder for feeding a sheet of recording paper to a sheet feed inlet; an image forming unit for forming a printing image onto a photosensitive drum based on printing data and transferring the printing image onto the sheet; and a fixing unit for fixing the transferred image on the sheet. The apparatus further comprises a sheet switching guide mechanism by which the head end of the sheet is switched to both upper and lower directions. When the sheet switching guide mechanism is set to the upper direction, the printed sheet is forwarded by a sheet guide member to thereby pass through the printing path the sheet has already been through with the rear side of the sheet being the front, and the printing data is written from the last line during this process.

5 Claims, 17 Drawing Sheets

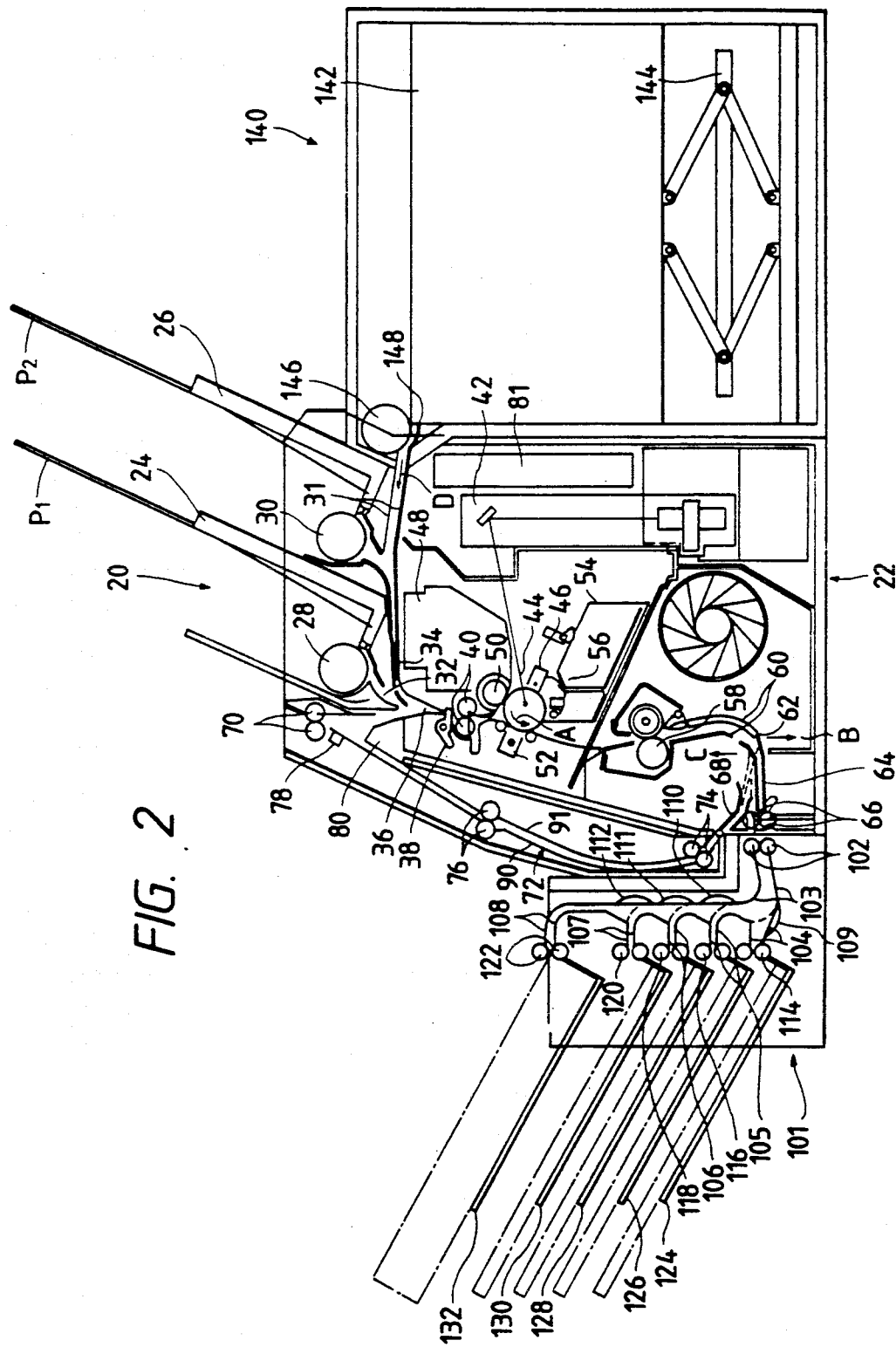

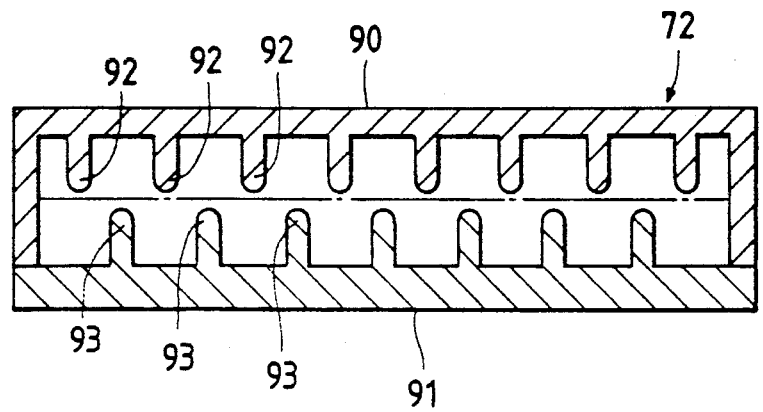
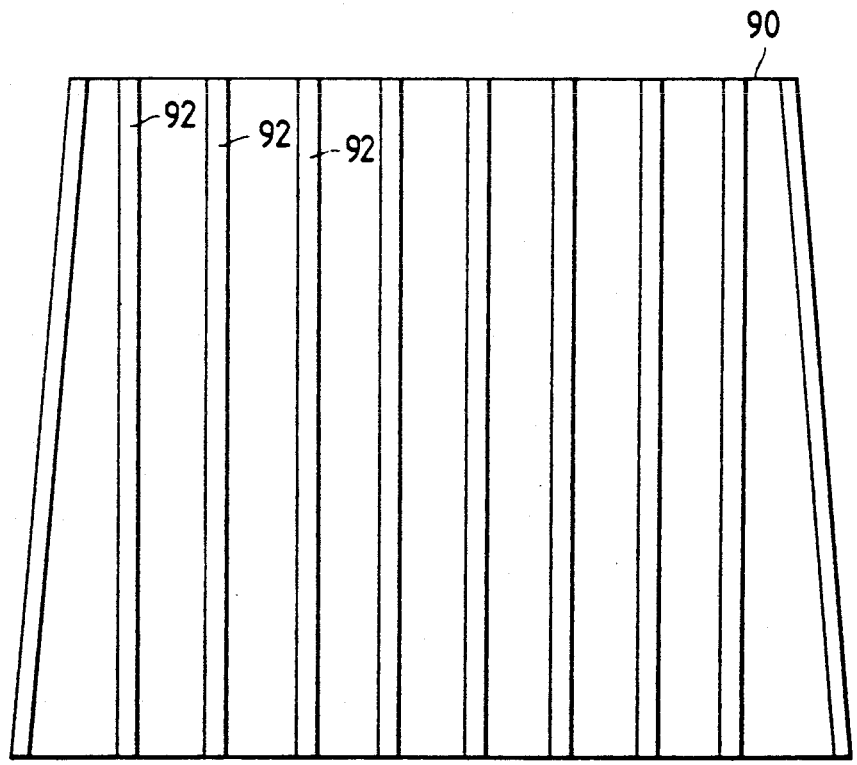

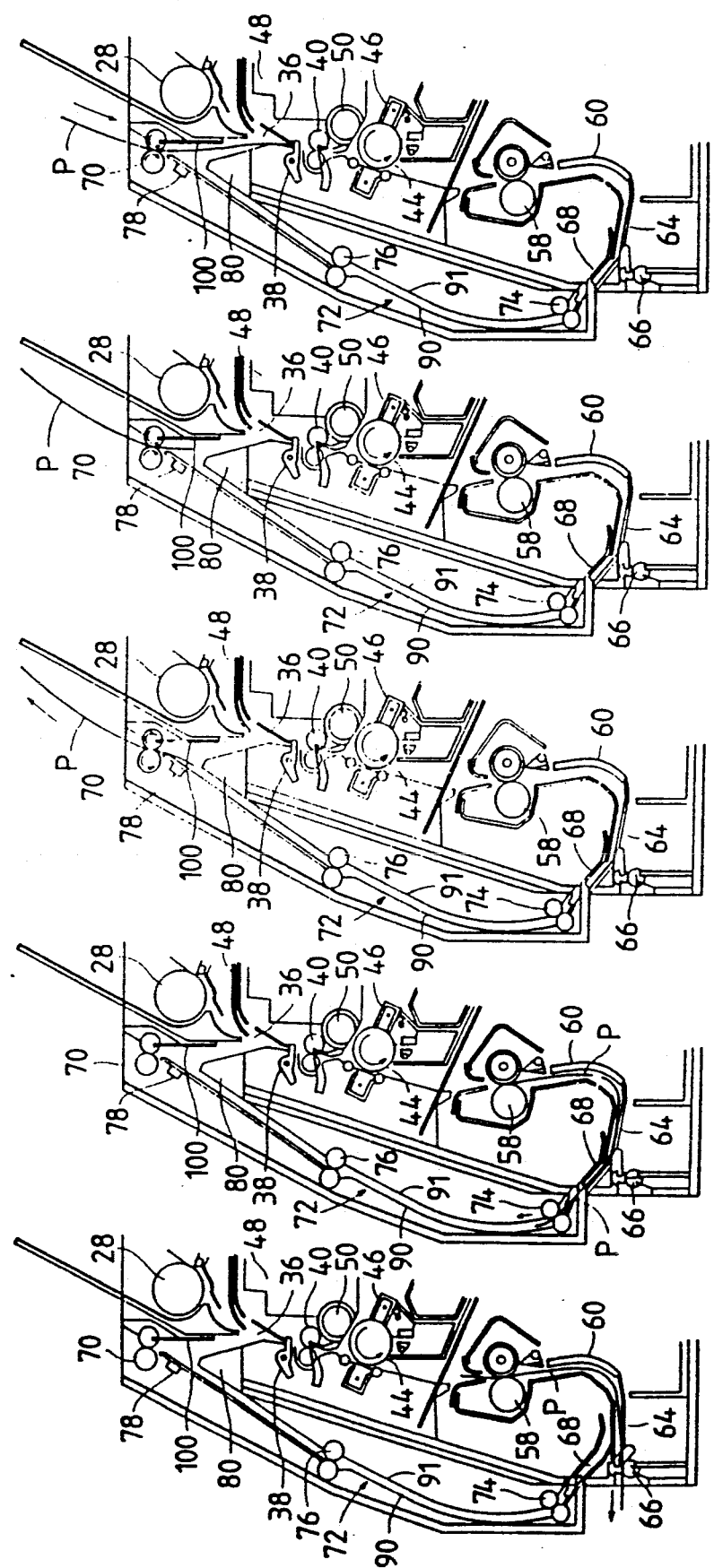

ELECTROPHOTOGRAPHIC RECORDING APPARATUS

BACKGROUND OF THE INVENTION

1. Field of the Invention

This invention relates to an electrophotographic recording apparatus which prints characters and graphics on a sheet of paper using electrophotographic technology, and more particularly to a technique of handling the recording paper from the paper stocking position to the printed paper collecting position.

2. Description of the Related Art

In attempts to respond to the needs for high-quality and high-speed printing, electrophotographic recording apparatuses based on the principle of the so-called "xerography" have been developed for practical applications. "Xerography" involves the process in which the optical beam controlled by printing data is irradiated onto a cylindrical photosensitive body to form a latent image thereon; colored toner is caused to adhere electrostatically to the latent image thus formed; and the toner image is then transferred to recording paper to thereby subject the image to a thermocompression bonding.

The printing technique using these electrophotographic recording apparatuses can produce high-density images at high printing speeds per unit time, thereby replacing conventional printing techniques such as offset printing and typography with the so-called desktop publishing in the field of small-scale printing.

In order to provide the best service in such a field of printing, electrophotographic recording apparatuses must be equipped with functions of printing on both sides of a sheet, sorting the printed sheets by page, printing large amounts of sheets with one supply of sheets, and requiring only a small floor area of installation.

In order to meet these requirements, Japanese Patent Application (UPA) Nos. 167853/1989, 170953/1989 (the term "UPA" as used herein means "Unexamined Published Application") disclose electrophotographic recording apparatuses whose printing path is arranged vertically which causes a printed sheet to be inverted.

These electrophotographic recording apparatuses, allow for the required area of installation to be reduced in proportion to the realized reduction in sheet forwarding floor area.

However, such electrophotographic recording apparatuses have not addressed the problem of sorting the printed sheets by page. The printed sheets are only piled up in the same tray when a large quantity of copies are made.

In addition, these electrophotographic recording apparatuses are available only for cut sheet printing and may not be capable of producing high-quality printing for continuous forms and slips in which positioned entries are required because they may print out of the specified position.

The arrangement of a stacker or vertical stackers in order to reduce the floor area of installation not only causes sheets to be bent due to sheets falling from the sharply standing stacker, but also entails the cumbersome operation of attaching and detaching the stacker to the apparatus body.

In order to overcome these problems, Japanese Patent Application (UPA) Nos. 76073/1989 and 49059/1989 disclose a type of electrophotographic recording apparatus with its stacker(s) arranged horizontally.

However, in such an electrophotographic recording apparatus, the end portion of the cassette containing the recording sheets is located further behind the recording mechanism, and as a result the cassette extrudes from the apparatus body, thereby requiring a larger floor area of installation.

SUMMARY OF THE INVENTION

A first object of the present invention is therefore to provide a novel electrophotographic recording apparatus capable of continuously printing both front and rear sides of a recording sheet without increasing the floor area of installation.

A second object of the present invention is to provide an releasable electrophotographic recording apparatus capable of arranging a page sorter for printed sheets without increasing the floor area of installation.

A third object of the present invention is to provide a novel electrophotographic recording apparatus capable of selectively printing on both a cut sheet and a continuous sheet.

A fourth object of the present invention is to provide a novel electrophotographic recording apparatus capable of continuously printing large amounts of copies with one supply of recording sheets.

A fifth object of the present invention is to provide an electrophotographic recording apparatus capable of properly loading a recording sheet by horizontally stacking the sheet without increasing the floor area of installation.

Other objects of the present invention will be apparent from the descriptions of the embodiments thereof.

In order to achieve these objects, the electrophotographic recording apparatus according to the present invention includes means for feeding sheets, means for forming a printing image onto a photosensitive drum based on printing data and transferring the printing image onto the sheet, and means for fixing the transferred image on the sheet. These means are arranged vertically in upper and lower portions. In addition sheet switching guide means for switching the head end of the sheet in two directions is arranged at a sheet discharge outlet of the fixing means. When the sheet switching guide means is set to the upper direction, a printed sheet is forwarded to a second sheet guide member, inverted, and passed through the original printing path, in which process the printing data is written from the last line on the sheet. Accordingly, the required floor area of installation of the apparatus may be reduced as much as possible.

BRIEF DESCRIPTION OF THE DRAWINGS

FIG. 2 is a sectional view showing a first embodiment of the system according to the present invention in which the electrophotographic recording apparatus, a sorter, and a large-capacity sheet feeder are combined;

FIGS. 3 and 4 are sectional views showing the structure of a second sheet guide member of the apparatus shown in FIG. 2, and a front view of one of the board members, respectively;

FIGS. 7(A) through 7(E) are sequential diagrams explaining an operation of the apparatus shown in FIG. 2;

DETAILED DESCRIPTION OF THE PREFERRED EMBODIMENTS

Figure 1:
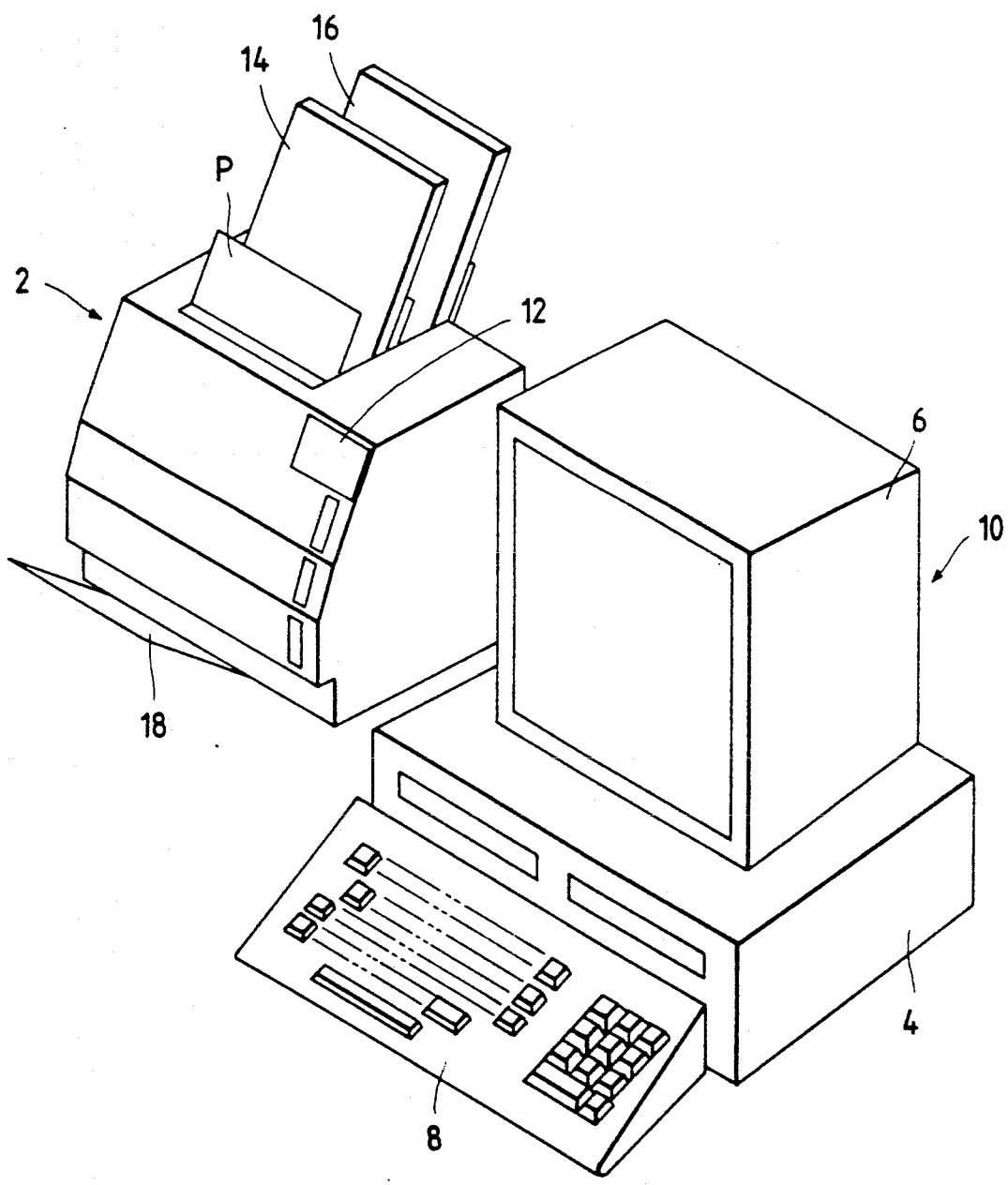
FIG. 1 is a perspective view showing the general configuration of a system using an electrophotographic recording apparatus according to the present invention.

FIG. 1 shows a configuration of an electrophotographic recording apparatus according to the present invention. The electrophotographic recording apparatus, reference numeral 2 is very often used installed near a personal computer system 10 which includes a computer body 4, a display unit 6, and a keyboard 8. The operation panel 12 on such an electrophotographic recording apparatus 2 is oriented substantially the same as the keyboard 8. The stackers 14 and 16, used stacking sheets of recording paper, are releasable and mounted on the upper portion of the apparatus for paper feeding into the apparatus. The manual insertion of one sheet of paper possible with P is the stacker located closest to the operator. The printed paper is discharged with the printed side facedown to a tray 18 located in front of the apparatus.

FIG. 2 shows a first embodiment of the electrophotographic recording apparatus. Reference numeral 20 designates a first sheet feeder releasably mounted on the upper portion of the apparatus body 22. The apparatus in this embodiment is provided with stackers 24 and 26 allowing two different sizes of printing paper P1 and P2 to be therein stocked. Pickup rollers 28 and 30 are for taking these sheets of paper P1 and P2 out of the stackers on a sheet by sheet basis and thereby feed through sheet discharge outlets 32 and 34 to a sheet feed inlet 36.

On the lower portion of the sheet feed inlet 36 is a sheet detector 38 for detecting the setup of a sheet of recording paper to be printed. When the head end of the sheet is properly positioned in a predetermined manner, the sheet is forwarded to gate rollers 40 whereby the sheet is taken down to a printing mechanism.

Downstream of the gate rollers is the printing mechanism beginning with a photosensitive drum 44 (which rotates in the direction of arrow A in order to forward the recording paper downward) and an optical beam from an optical beam control mechanism 42 which is used for writing. Positioned around the photosensitive drum 44 are: a charging unit 46, a developing unit 48, a sleeve 50, a transfer unit 52, a toner recovering unit 54, and an eraser 56. Below the photosensitive drum 44 is a fixing unit 58 for fixing the toner transferred on the recording paper. All these components constitute the printing mechanism.

Below the fixing unit 58, (i.e., on the side of a sheet discharge outlet) are fixed sheet discharge guide boards 60 and switching guide boards 64 that turn around the sheet discharge outlet 62. The switching guide boards 64 serve to change the path of the sheet. When turned in the direction of the arrow B, the sheet is forwarded to discharge rollers 66; whereas, when turned in the direction of the arrow C, the sheet is directed to a second sheet guide 68.

The second sheet guide member 68 comprises a sheet guide board 72, which extends from the switching guide boards 64 to the uppermost sheet take-out rollers 70, and includes therebetween sheet forwarding rollers 74 and 76. The pairs of sheet forwarding rollers, 74 and 76, are spaced shorter than the minimum sheet length to facilitate forwarding the sheet upward. This second sheet guide member 68 is arranged on the front side of the apparatus body 22 (i.e., on the side of the sheet forwarding path). The sheet take-out rollers 70 take the sheet up from the sheet guide board 72 and then are reversely rotated by a signal from a tail end detector 78, and thereby, forward the sheet P back downward.

The tail end detector 78, used for detecting the tail end of the sheet when rear-side printing is required, is located below the take-out rollers 70 and above the top of a triangular sheet forwarding path switching member 80.

FIGS. 3 and 4 show an embodiment of the sheet guide board 72, which comprises board bodies 90 and 91 confronting each other at a predetermined distance. The confronting surface of each of the board bodies, 90 and 91, is provided with a plurality of projecting members 92 and 93 in parallel with each other in the sheet forwarding direction. Projecting members 92 confront projecting member 93 in a staggered manner.

Figure 5:
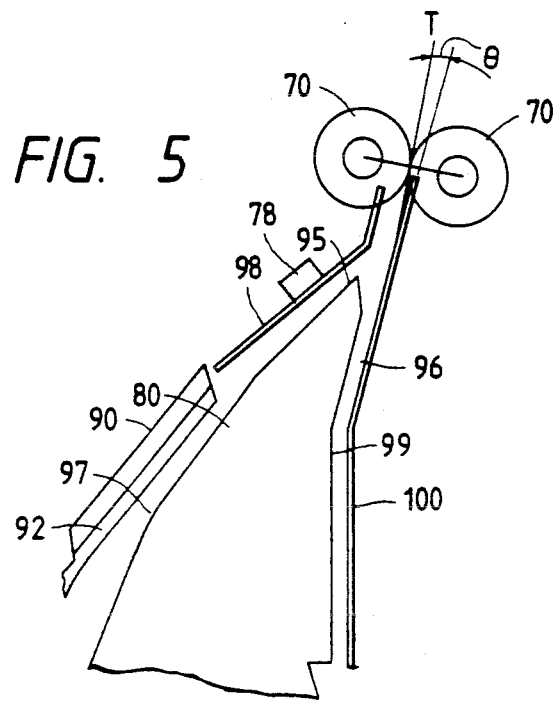
FIG. 5 is a sectional view showing the structure of a sheet separating member of the apparatus shown in FIG. 2 and its vicinity.

FIG. 5 shows the structure of the sheet forwarding path switching member 80 and its location. The top of this sheet forwarding path switching member 80 has a vertical cross-section which is triangular facing the take-out rollers 70 and is cut so as to expand the space or the entrance of an upward printing path 96, upward. The top 95 is located outside the tangent T of the take-out rollers 70, (i.e., to the left of the figure) so that the tail end of the sheet can easily be received from an upward to a downward printing path 96. On a slope 97 of the sheet forwarding path switching member 80 is a guide board 98 that extends from its end portion and confronts the member 80 at an interval allowing the sheet to be guided. On the other slope 99 is a guide board 100 that is arranged to form the printing path 96. This guide board 100 is arranged so that it intersects the tangent T at a pressure contact point of the take-out rollers 70 at an angle $\theta$, which is approximately 5°, and the head end of the sheet pulled down from the rollers 70 is caused to come into contact with the guide board 100.

In FIG. 2, reference numeral 101 designates a sorter that is releasably mounted to the electrophotographic recording apparatus. The sorter has sorter forwarding rollers 102 at a position where they are on the same level as the discharge rollers 66 of the electrophotographic recording apparatus body. On the end portions of the sorter forwarding rollers 102 (i.e., on the discharge side) there are sorter guide boards 103 that rise upright from the horizontal surface. On the vertical surface are a plurality of bin guides 104, 105, 106, 107, and 108 that are arranged at a predetermined interval and bin selecting gate members 109, 110, 111, and 112 that serve to send the sheet into the bin guides. The end portions of the bin guides 104 through 108 are provided with sheet discharge rollers 114, 116, 118, 120, and 122, respectively. The end portions of the sheet discharge rollers 114 through 122 are provided with releasable bin trays 124, 126, 128, 130, and 132 so that each discharge outlet faces downward.

Also in FIG. 2, reference numeral 140 designates a large-capacity sheet feeder, which is releasably mounted to the electrophotographic recording apparatus body 22, for continuously supplying a large quantity of pre-stacked sheets. Reference numeral 142 designates a large-capacity cassette capable of horizontally stocking some 2000 sheets of recording paper. The bottom of this cassette is equipped with a push-up mechanism 144 for successively feeding the discharge outlet pickup roller 146 according to the number of sheets printed. Whereas, the top of the cassette 142 is provided with the discharge outlet pickup roller 146 and a pickup pad 148 which each come into contact with the electrophotographic recording apparatus.

Figure 6:
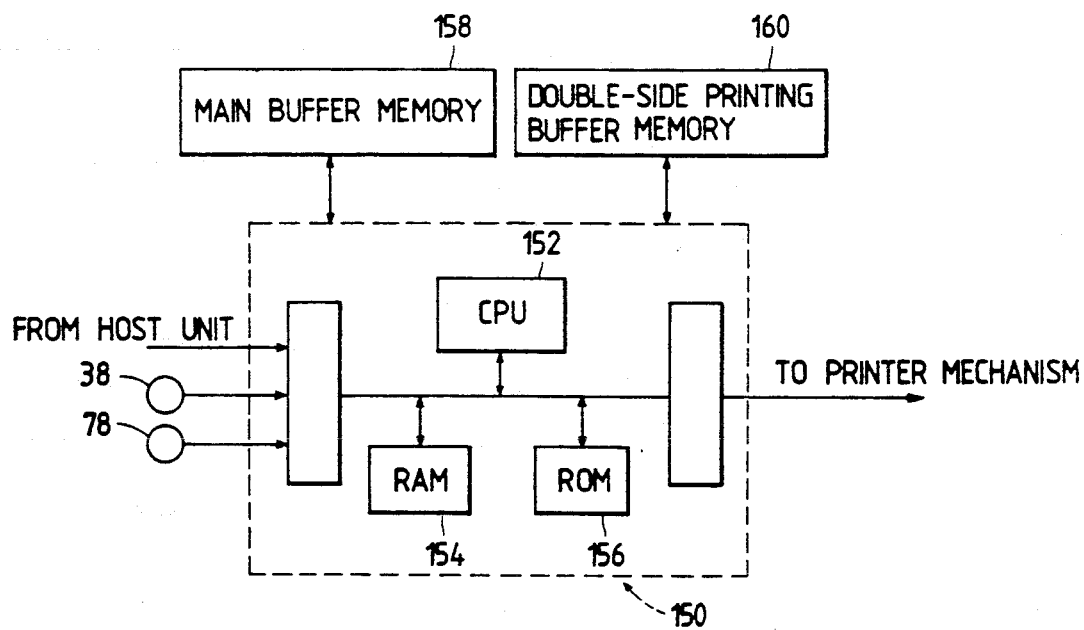
FIG. 6 is a block diagram showing a control unit of the apparatus shown in FIG. 2.

FIG. 6 shows an embodiment of a control unit, in which reference numeral 150 designates a microcomputer including a central processing unit (CPU) 152, a random access memory (RAM) 154, and a read only memory (ROM) 156. The microcomputer 150 controls not only the optical beam control mechanism 42 (FIG. 2) based on printing data transmitted from the host unit 10 (FIG. 1), but also the sheet forwarding path based on a signal from the respective detectors 38 and 78 depending on the single-side printing mode or double-side printing mode set via the operation panel 12 or the host unit 10 (FIG. 1).

Reference numeral 158 designates a main buffer memory for receiving the printing data from the host unit 10. This buffer memory 158 stores the printing data in response to a command from the microcomputer 150 and applies the printing data to the optical beam control mechanism 42 through the microcomputer 150 at the time of printing.

Reference numeral 160 designates a double-printing buffer memory which reads the printing data out of the main buffer memory 158 from the last line, stores it, and applies it to the optical beam write control mechanism 42.

An operation of the electrophotographic recording apparatus embodiment thus constructed will next be described with reference to the explanatory diagrams shown in FIG. 7.

When the photosensitive drum 44 is rotated at a constant speed, its surface is charged to a predetermined potential by the charging unit 46. When a light beam is irradiated onto the photosensitive drum 44 surface according to the image data from the optical beam control unit 42, as described above, the irradiated portion becomes electroconductive and forms a latent image on the photosensitive drum 44. This latent image is rendered into a real image or a toner image by its contact with the toner through the sleeve 50 of the developing unit 48.

Figure 9:
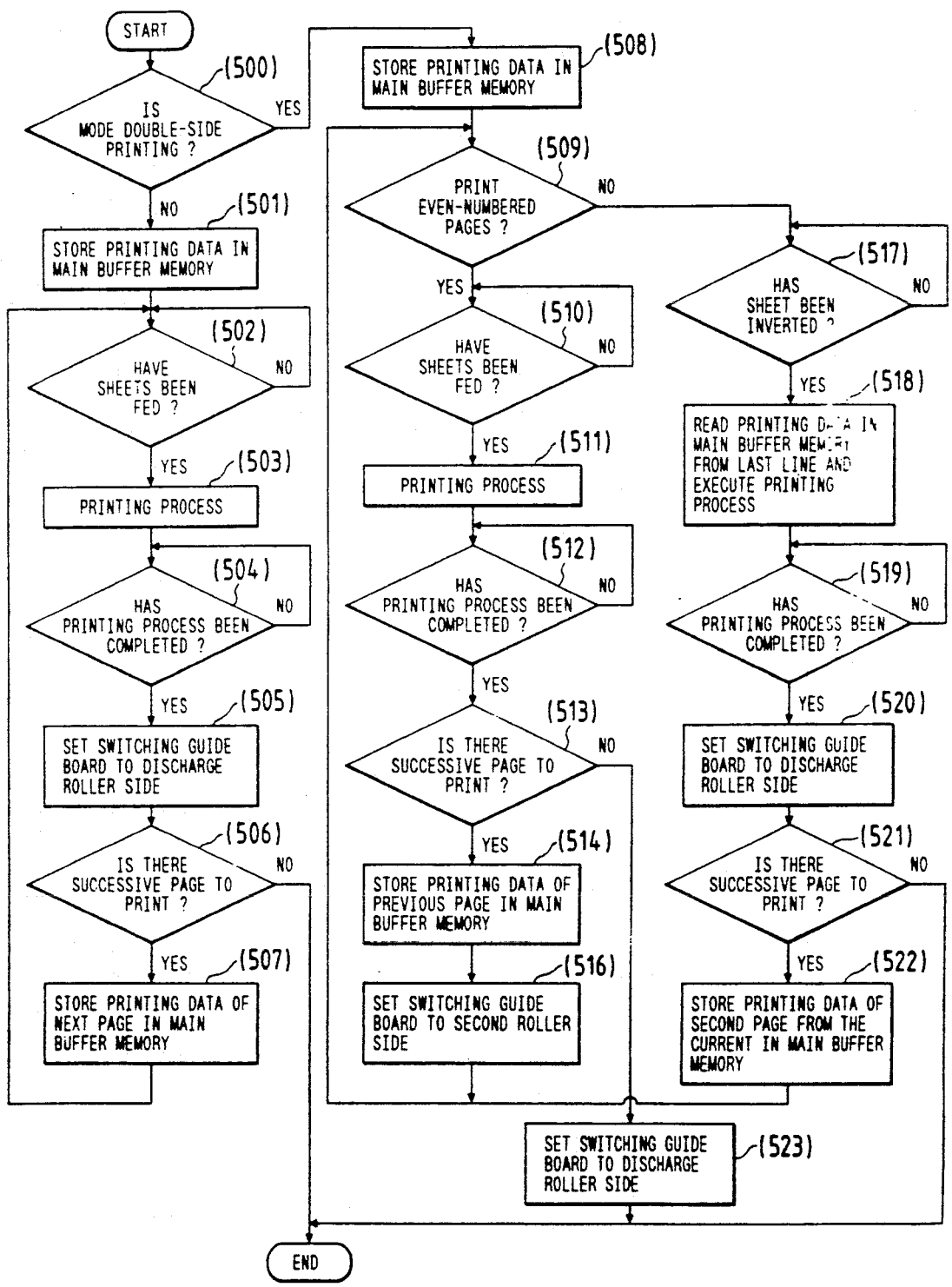
FIG. 9 is a flowchart showing an operation of the apparatus shown in FIG. 2 in which one-side printing and double-side printing are performed for a single copy.

Single-side printing mode:

Upon instruction of the single-side printing mode via the host unit or the operation panel, the microcomputer 150 sets a path for a direct output of the main buffer memory 158 to the optical beam write control mechanism 42, bypassing the double-side printing buffer memory 160. Upon output of printing data from the host unit, the microcomputer 150 not only causes the main buffer memory 158 to store that data (Step 501 in FIG. 9), but also prepares the electrophotographic recording apparatus for printing.

That is, the sheet P stocked in the stacker section 24 or 26 in the first sheet feeder 20 is introduced to the sheet feed inlet 36 from the pickup rollers 28 or 30; the head end of the sheet P is stopped by the gate rollers 40. The sheet P is then further forwarded so that it will be bent, thereby causing the sheet detector 38 to operate (Step 502). A signal from the sheet detector 38 causes gate rollers 40 to rotate synchronously with the rotation of the photosensitive drum 44 (the surface of which has adhered toner); thereby the sheet P is forwarded toward this photosensitive drum 44. The transfer unit 52 electrifies the back of the sheet P and attracts the toner that is on the surface of the photosensitive drum 44 toward the surface of the sheet P, and thereby the toner is transferred onto the sheet. The transferred toner is fixed on the sheet P while the sheet is passing through the fixing unit 58 (Steps 503 and 504).

The sheet P that has exited from the fixing unit 58 is discharged to the discharge roller 66 while being guided by the fixed sheet discharge guide boards 60 and the switching guide boards 64 (FIG. 7(A)) (Step 505). If printing of a successive page is required (Step 506), that printing data is stored in the main buffer memory 158 (Step 507) and the printing operation beginning with Step 502 and on is repeated for the desired number of pages.

DOUBLE-SIDE PRINTING MODE

Upon instruction of the double side printing mode (Step 500), the microcomputer 150 first sets a path for a direct output of the main buffer memory 158 to the optical beam write control mechanism 42. Upon receipt of the printing data from the host unit, the microcomputer 150 stores it in the main buffer memory 158 (Step 508).

Figure 8B:
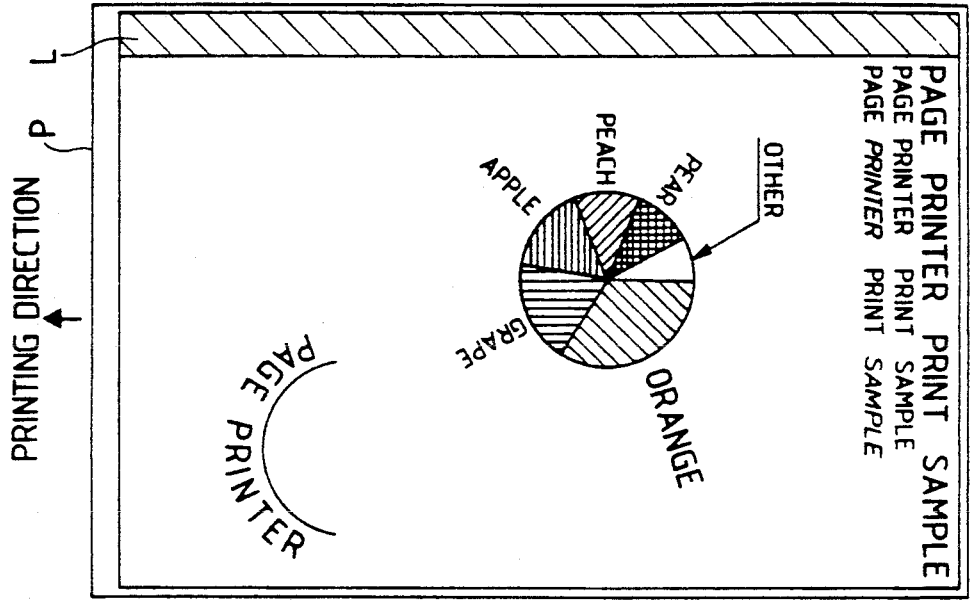
FIGS. 8A and 8B are diagrams showing examples of front-side printing and back-side printing by the apparatus shown in FIG. 2, respectively.
Figure 8A:
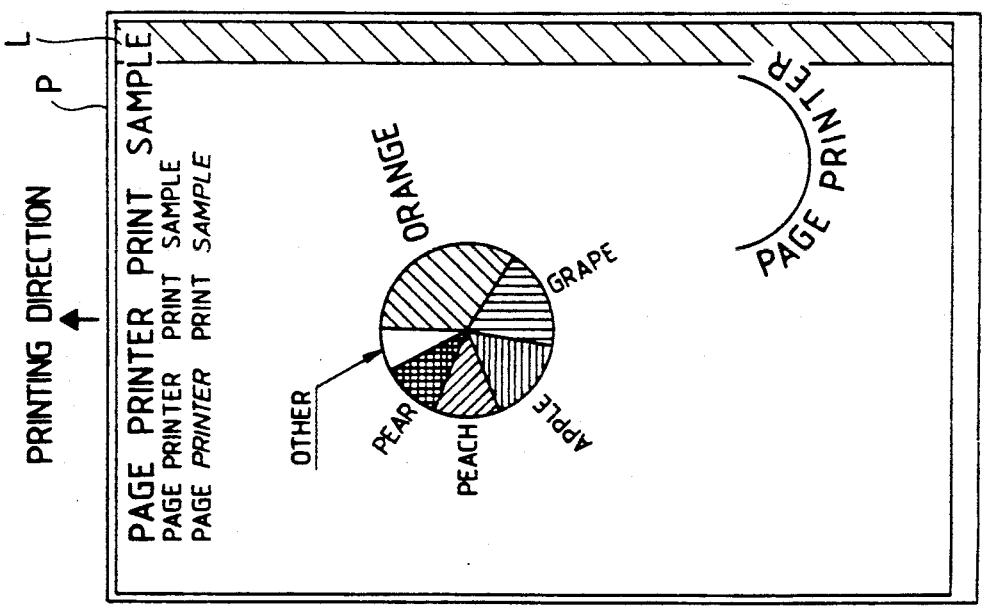

The above operation is for single-page printing. In order to start with a second page with proper pagination (Step 509), the microcomputer 150 causes a first sheet P stocked in the stacker section 24 or 26 to be ushered into the sheet feed inlet 36 by the pickup rollers 28 or 30; the head end of the sheet P stopped by the gate rollers 40. The and the sheet P is then further forwarded to thereby operate the sheet detector 38 (Step 510). At this point, the microcomputer 150 not only causes the gate rollers 40 to operate, but it also causes the optical beam write control mechanism 42 to write the printing data within the main buffer memory 158 to the photosensitive drum 44. The photosensitive drum 44 rotates synchronously with the forwarding speed of the sheet P adjusted by the gate rollers 40. The latent image is thereby formed then rendered into a real image by the developing unit 48; this real image is transferred onto one of the sides from head to tail of the sheet P while entering the transfer region of the transfer unit (FIG. 8A). Then the sheet enters the fixing unit 58 and has the toner applied to its surface in order to be fixed; it is and then further forwarded to the fixed sheet discharge guide boards 60 (Step 511).

Upon completion of the writing of the printing data of the second page onto the photosensitive drum 44 (Step 512), the microcomputer 150 requests the host unit to transmit the printing data of the first page (i.e., the front side, Step 513), and stores this data in the main buffer memory 158 (Step 514).

The microcomputer 150 switches the switching guide boards 64 to the second guide member 68 side (Step 516). This causes the sheet to be forwarded upward (FIG. 7(B)) while guided by the second guide member 68 with the second guide rollers 74, thereby bypassing the discharge rollers 66. of the sheet moves upward along the sheet guide board 72, the projecting members 92, 92, 92 . . . and 93, 93, 93 . . . , which extend vertically, help cause the sheet to go up along the second guide member smoothly with only minimal friction. Since the projecting members on the one side and those on the other side are staggered, the sheet gets slightly, so to speak, "corrugated" and thus becomes firm. For this reason, even if the head end of the sheet touches an obstacle, it can overcome the obstacle without being folded, thereby moving upward without being jammed.

In this way, the sheet P is guided up to the sheet take-out rollers 70 (FIG. 7(C)) and when the tail end of the sheet P passes by the tail end detector 78, it produces a signal to reversely rotate the take-out rollers 70 (FIG. 7(D)). As a result, the sheet P is forwarded downward.

In the process of drawing the sheet downward, the tangent of the take-out rollers 70 intersects the surface of the guide board 100, so that the tail end of the sheet is forwarded downward in contact with the guide board 100. Furthermore, the upper end of the forwarding path switching member 80 allows the space above it to be open wider ensuring that the sheet is guided to the printing path side, namely the sheet feed inlet 36.

Accordingly, the blank surface of the sheet faces the photosensitive drum 44 which is set with a predetermined width (i.e., with a binding margin L that corresponds to that of the front page) (FIG. 7(E)). At this stage, the take-out rollers 70 are rotated so as to forward the sheet P downward. As a result, the sheet P is bent with its tail end pressed by the gate rollers 40 to thereby operate the sheet detector 38 (Step 517). Upon storing of the first page data in the main buffer memory 158, the microcomputer 150 starts reading this data from the start of the last line and writes to the double-side printing buffer memory 160.

The microcomputer 150 then rotates the gate rollers 40 synchronously with the writing to the photosensitive drum 44 and forwards the sheet from the side which will be the last line of printing to the photosensitive drum 44. Then the data is read from the first address of the double-side printing buffer memory 160 and applied to the optical beam write control mechanism 42. This causes the printing data to be printed on the sheet P from the last line to the first line (FIG. 8b) (Steps 518 and 519).

After the sheet P exits from the fixing unit 58 (guided by the fixed sheet discharge guide boards 60), and enters the switching guide board 64. Since the switching guide board 64 has been switched to the (Step 520), the sheet P is discharged outside the apparatus body from the discharge roller 66 without entering the second guide member 68 (FIG. 7(A)).

If there is data of a successive page (Step 521), upon completion of the printing on both sides of the first sheet P the data of the successive page is stored in the main buffer memory 158 (Step 522). Returning to Step 509, the microcomputer 150 starts printing the second sheet (i.e., the data of the fourth page). This operation is thereafter repeated. In the absence of the data of even-numbered pages (Step 513), the printing is completed and the switching guide board 64 is down to the discharge roller 66 side to thereby discharge the sheet (Step 523).

Figure 10:
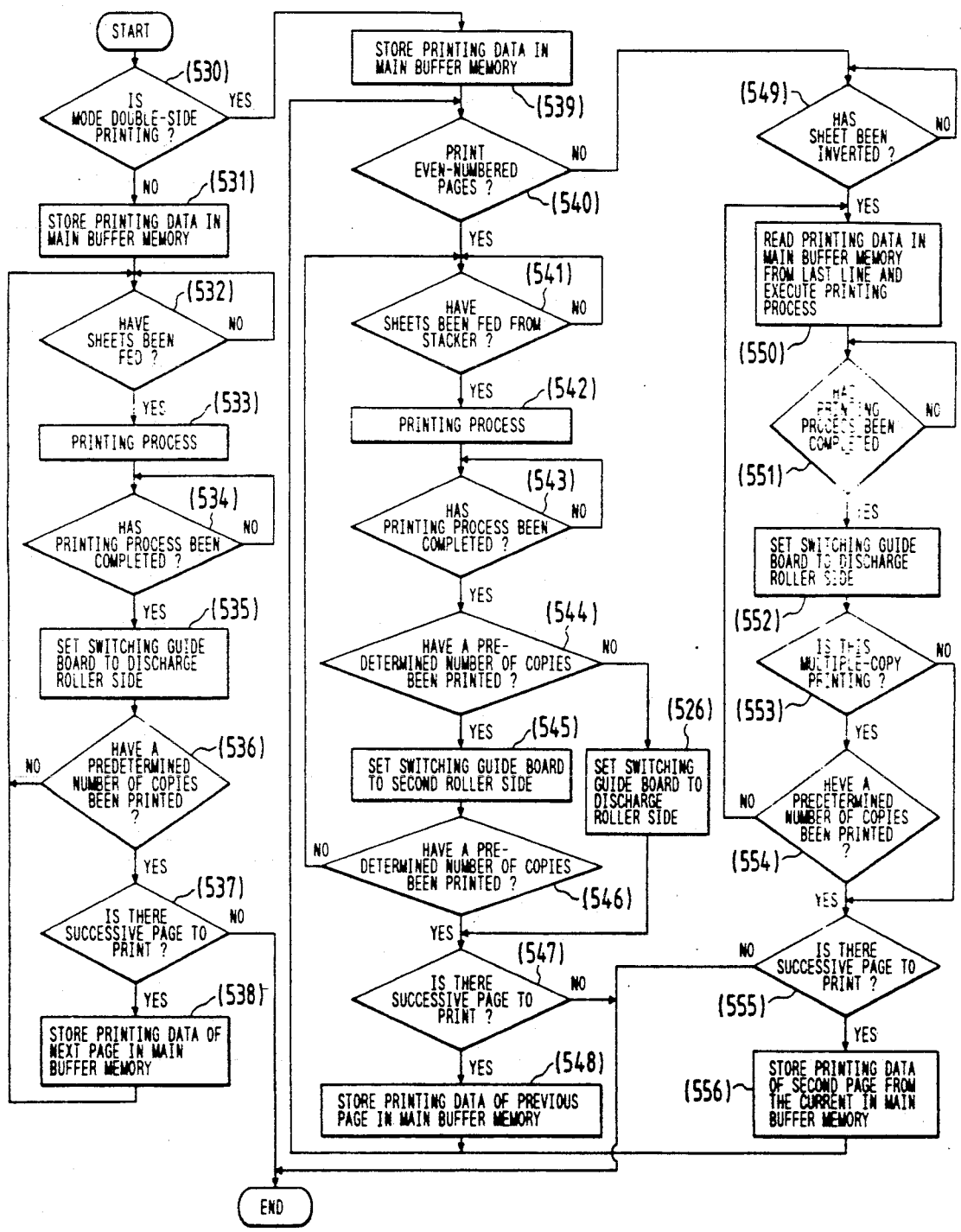
FIG. 10 is a flowchart showing an operation of the apparatus shown in FIG. 2 in which one-side printing and double-side printing are continuously performed for a plurality of copies.

Although the case where one copy is made per page has been described in the double-side printing mode of this embodiment, a plurality of copies per page or continuous printing as shown by the flowchart of FIG. 10 may be performed without changing the data.

That is, upon instruction of the single-side printing mode (Step 530), the microcomputer 150 sets a path for a direct output of the main buffer memory 158 to the optical beam write control mechanism 42 bypassing the double-side printing buffer memory 160. Upon output of the printing data from the host unit, the microcomputer 150 not only stores that data in the main buffer memory 158 (Step 531) but also causes the electrophotographic recording apparatus to get ready for printing.

That is, a sheet P of recording paper stocked in the stacker section 24 or 26 disposed in the first sheet feeder 20 is introduced to the sheet feed inlet 36 from the pickup rollers 28 or 30 the head end of the sheet P is stopped by the gate rollers 40. The sheet P is then further forwarded so that it will be bent, thereby causing the sheet detector 38 to operate (Step 532). Accordingly, the printing process is started (Step 533). Upon completion of the printing process (Step 534), the switching guide board 64 is down to allow the discharge roller 66 to discharge the printed sheet outside the apparatus body (Step 535). In order to print the same data on another sheet (Step 536), the process from Step 532 onward is repeated without new data transfer.

In order to print the next page after printing a predetermined number of copies (Step 537), the printing data for the next page gets stored in the main buffer memory 158 (Step 538) and the process beginning with Step 532 is repeated.

On the other hand, when the double-side printing mode is selected (Step 530), the microcomputer 150 sets a path for a direct output from the main buffer memory 158 to the optical beam write control mechanism 42. Upon output of printing data from the host unit, the microcomputer 150 causes the main buffer memory 158 to store this printing data (Step 539). When the printing data is ready, the first sheet P stocked in the stacker sections 24 or 26 is inserted by the pickup rollers 28 or 30 into the sheet feed inlet 36; the head end of the sheet P is stopped by the gate rollers 40. The sheet P is then further forwarded so that it will be bent to operate the sheet detector 38 (Steps 540 and 541). At this point, the microcomputer 150 causes the data to be printed on the back of the sheet using the same process as described above (Step 542). When the printing process has been completed (Step 543), Step 544 determines whether or not the data will be printed for a plurality of copies. If the data is to be successively printed for more pages, the switching guide board 64 is switched to the second guide roller 74 side (Step 545). Accordingly, the sheet is forwarded upward while guided to the sheet guide board 72 by the second guide rollers 74 bypassing the discharge rollers 66 (FIG. 7(B)).

In parallel with the process of forwarding the printed sheet upward, the microcomputer 150 causes the second sheet P stocked in the stacker sections 24 or 26 to be discharged, returns to Step 541, and causes the same data in the main buffer memory 158 to be printed without data being transferred from the host unit.

When the printing of a predetermined number of copies has been completed (Step 546) and a plurality of sheets having the same data printed thereon are accumulated on the sheet guide board 72, the microcomputer 150 causes the printing data of the previous page to be transferred to the main buffer memory 158 (Steps 547 and 548) and determines whether the page to be printed is odd-numbered or even-numbered (Step 540).

In parallel with this process, the first sheet P accumulated in the sheet guide board 72 is guided to the sheet take-out rollers 70 (FIG. 7(C)). When it is further pulled up so that the tail end of the sheet P passes through the tail end detector 78, a signal is produced by the tail end detector 78 to thereby reversely rotate the take-out rollers 70 (FIG. 7(D)). Accordingly, the sheet P is properly introduced into the sheet feed inlet 36 and received by the gate rollers 40. The side on which no data has been printed yet is positioned so that it faces the photosensitive drum 44 which is set with a predetermined width (i.e., providing a binding margin L that corresponds to that of the rear side of the sheet) (FIG. 7(E)). The take-out rollers 70 are reversely rotated so that the sheet P can be forwarded downward. This causes the sheet P to be bent with its tail end being pressed by the gate rollers 40 which thereby operate the sheet detector 38 (Step 549).

The microcomputer 150 starts reading the printing data of the first page, or the front side, from the main buffer memory 158 into the double-side printing buffer memory 160 with its last line as the first piece of data (Step 550).

The microcomputer 150 then causes the gate rollers 40 to rotate synchronously with the writing of the data to the photosensitive drum 44. The sheet is introduced to the photosensitive drum 44 "from tail to head" in terms of the direction of printing which causes the data to be applied to the optical beam write control mechanism 42 beginning with the first address of the double-side printing buffer memory 160. Thus, the sheet is subjected to inverted printing from tail to head (FIG. 8B).

The sheet P that has exited from the fixing unit 58 is forwarded via the fixed sheet discharge guide boards 60 to the switching guide board 64 and thereby the front-side printing is completed (Step 551). Since the switching guide board 64 has been switched to the discharge rollers 66 (Step 552), the sheet is discharged from the discharge rollers 66 outside the apparatus without entering the second guide member 68 (FIG. 7(A)). While other sheets remain in the sheet guide board 72 (Steps 553 and 554), the microcomputer 150 returns to Step 550 to repeat the above-described process.

If the additional pages must be printed, after completion of the double-side printing for a predetermined number of copies in this way (Step 555), the microcomputer 150 stores the printing data of the next two pages (i.e., the fourth and third pages) in the main buffer memory 158 (Step 556), and the process starting with Step 540 onward is repeated in order to print the fourth and third pages.

If printing is terminated with an odd-numbered page (Step 544), the switching guide board 64 is set to the discharge roller 66 side to discharge the printed sheet outside the apparatus.

When a plurality of pages are printed in this way, the sorting of the printed sheets by page will help make the successive processes easier.

Toward this end, the page managing data, in addition to the data within the microcomputer 150 that is responsible for managing all of the operations of the electrophotographic recording apparatus body 22, is applied to the sorter 101.

The sheet discharged from the discharge rollers 66 is taken on by the sorter forwarding rollers 102, and is fed to the sorter guide boards 103. If the lowermost bin tray 124 holds the first sheet and the uppermost bin tray 132 holds the fifth sheet, the bin selecting gate member 109 is operated to thereby close the path for introducing the sheet upward when the first sheet enters the sorter guide boards 103. This maintains the horizontal position of the sheet that has entered through the sorter guide boards 103, and admits the sheet into the first bin guide 104 by the bin selecting gate member 109 to thereby introduce the sheet into the first bin tray 124 with the discharge rollers 114. Thus, the sheet discharged from the electrophotographic recording apparatus body 22 can be subjected to a jam-free highly reliable sorting operation because it is received in an undamaged horizontal position. As the sheet advances, the bin selecting gate member 109 not only closes the bin guide 104 but also opens the path for the sorter guide boards 103.

When the second sheet is successively discharged from the electrophotographic recording apparatus body 22, the second bin selecting gate member 110 is operated to close the path located over the sorter guide boards 103. This causes the sheet to pass through the first bin selecting gate member 109 and the second bin selecting gate member 110 directs the sheet to the second bin guide 105 to be discharged to the second bin tray 126 by the discharge rollers 116. Upon completion of the sheet discharge operation, the bin selecting gate member 110 not only closes the bin guide 105 but also opens the path for the sorter guide boards 103.

Likewise, by successively operating the bin selecting gate members 111 and 112, the sheet direction is diverted to the bin guides 106, 107, and 108 corresponding to the respective pages.

In order to discharge to the uppermost bin tray 132, which is the fifth tray, the inlets of the bin guides 104 through 107 are closed by the bin selecting gates 109 through 112. Thus the sheet is guided to the bin guide 108 to be discharged to the bin tray 132.

For printing large amounts of copies, the large-capacity sheet feeder 140, which can accommodate 2000 sheets of recording paper in a horizontal position, is connected to the rear side of the electrophotographic recording apparatus body.

After the large-capacity sheet feeder 140 is attached, the microcomputer 150 applies a sheet feed instruction to the pickup roller 146 of the large-capacity sheet feeder 140. When the pickup roller 146 starts rotating, the uppermost sheet is taken out from the large-capacity pickup pad 148 as a result of pressure from both the pickup roller 146 and a plate spring. The sheet is forwarded in the direction of arrow D through a guide path 31 and discharged to the sheet feed inlet 36. When the sheet is further forwarded by the pickup roller 146, the head end of the sheet is stopped by the gate rollers 40 so that the sheet will be bent and operate the sheet detector 38.

This causes the microcomputer 150 to start the printing process which is similar to those beginning with the sheets from the stackers 24 or 26.

After the previous sheet has been printed and output the pickup roller 146 takes out the second sheet, discharges it to the sheet feed inlet 36, and causes the microcomputer 150 to likewise start the printing process again.

In parallel with the printing process, the push-up mechanism 144 is operated to thereby lift the stacked sheets from the bottom. This maintains the uppermost sheet at a predetermined height which thereby allows it to be properly taken out by the pickup roller 146.

Figure 11:
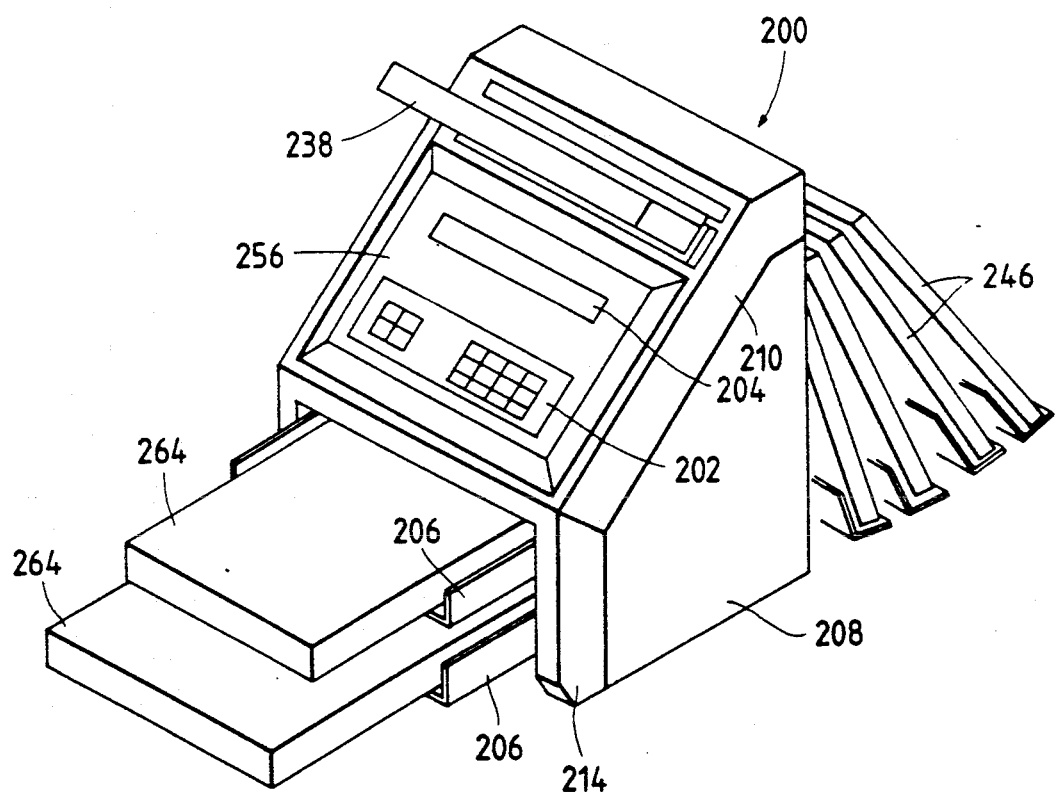
FIG. 11 is a schematic showing the appearance of a second embodiment of the electrophotographic recording apparatus according to the present invention.

FIG. 11 shows a second embodiment of the present invention. A recording apparatus body 200 is of such a design that an operation panel 202, a display unit 204, recording cassette mounting frames 206 and the like are vertically arranged on the sheet feeding side of the sheet forwarding path in an attempt to combine the efficient use of limited space and advantage of easy handling. It can be located close to a personal computer system because it is constructed such that all operations including recording mode selection and jam processing are performed from the front.

The detailed structure will be illustrated with reference to FIG. 12. The apparatus body 200 is arranged so that it can be divided into two portions, a lower unit 208 and an upper unit 210. The a sheet forwarding path extends obliquely upward from the sheet feeding or front side (left of the figure) to the sheet discharging, or rear side (right of the figure). The front side of the lower unit 208 is provided with a sheet feed unit 214 mounted so as to be separable with the vertical sheet feed guide 212.

The lower unit 208 comprises a photosensitive drum 216, a cleaning unit 218, and a charger; these three components are unitized by a supporting frame (not shown) in such a manner that the photosensitive drum 216 faces the sheet forwarding path and is releasably mounted. Upstream of the photosensitive drum 216 is a developing unit 222 which is removably mounted so that the opening of a toner hopper 220 faces the sheet forwarding path. On the rear side of the lower unit 208 are a U-shaped guide board 224 for inverting the sheet and a sorting guide board 226 arranged so as to bifurcate at a sheet forwarding path switching mechanism 228. The U-shaped guide board 224 is mounted so that its tail end is connected to an inverted sheet forwarding guide board 230 of the upper unit 210. The U-shaped guide board 224 is also arranged so that a discharge guide board 234 bifurcating upward at a sheet forwarding path switching mechanism 232 causes the sheet to be discharged to a discharge tray 238 through discharge rollers 236 which are arranged on the discharge end. Alternatively, the discharge end of the sorting discharge guide board 226 is provided with a sorting arm 242 capable of being angled in a stepwise manner using the shaft of the first discharge roller 240 as a pivot. This serves to discharge the sheet in any one of a plurality of sorting trays 246 (which are releasably arranged on the rear side of the lower unit 208) by the second discharge rollers 244 provided on the end portion of the sorting arm 242.

On the other hand, the upper unit 210 is mounted on the lower unit 208 so as to be freely opened and closed; the upper unit 210 can be inverted with a common shaft 250 fixed on the upper portion in the front of the lower unit 208 as a pivot. On the bottom of the upper unit 210 is a guide board 252 for guiding the sheet along the sheet forwarding path. In this portion, a pair of resist rollers 254, a transfer charger 257, and a fixing unit 258 are all located above the developing unit 222 at a position confronting the photosensitive drum 216. The upper surface of the upper unit 210 is entirely open and is provided with the inverted sheet forwarding guide board 230 substantially parallel with the lower guide board 252. With the upper unit 210 closed on the lower unit 208, the end portion of the sheet forwarding path is connected to the U-shaped guide board 224 on the lower unit 208. Likewise the end portion of the downstream path is connected to the guide board 230 of a sheet forwarding mechanism 254, which is on a sheet feed unit 214 (described later).

Reference numeral 256 is a sheet guide member which is additionally provided on the upper surface of the upper unit 210. This sheet guide member 256 is mounted so as to be freely opened and closed on the upper unit 210; thus, it can be inverted with the common shaft 250 that supports both the upper unit 210 and the sheet feed unit 214 (described later) as a pivot. The upper surface of the sheet guide member 256 is provided with, not only the operation panel 202 which is used for specifying various printing modes but also the display unit 204 (if necessary) for displaying the specified printing mode as shown in FIG. 11. The lower surface of the sheet guide member 256 is provided with a guide board 258 in cooperation with the guide board 230 for guiding the inverted sheet on the upper side of the upper unit 210. A plurality of driven rollers 262 are paired with sheet feed roller 260 on the upper unit 210 and are supported by the shaft.

On the other hand, the sheet feed unit 214 is arranged on the front side of the lower unit 208 and is supported so as to be pulled upward with the common shaft 250 as a pivot; therefore, the sheet feed guide 212 surface of the lower unit 208 can be opened. On the front of this sheet feed unit 214 is provided, one or more feed cassette mounting frames 206 and sheet feed rollers 266 for forwarding the sheets in the sheet feed cassettes 264. The sheet feed unit 214 has on its upper portion, the switchback type sheet forwarding mechanism 254 for sending back into the sheet forwarding path the inverted sheet after it has been forwarded through the inverted sheet forwarding guide board 230 on the upper surface of the upper unit 210. The inner surface of the sheet feed unit 214 is provided with not only a sheet feed guide board 268 for guiding the sheet forwarded by the sheet feed roller 266 in cooperation with the sheet feed guide 212 disposed in the front of the lower unit 208, but also a guide board 274 for guiding the sheet forwarded by the sheet feed roller 272. The sheet feed roller 272 receives the sheet from a large-capacity sheet container 270 which forms the frame for the apparatus body 200.

Figure 12:
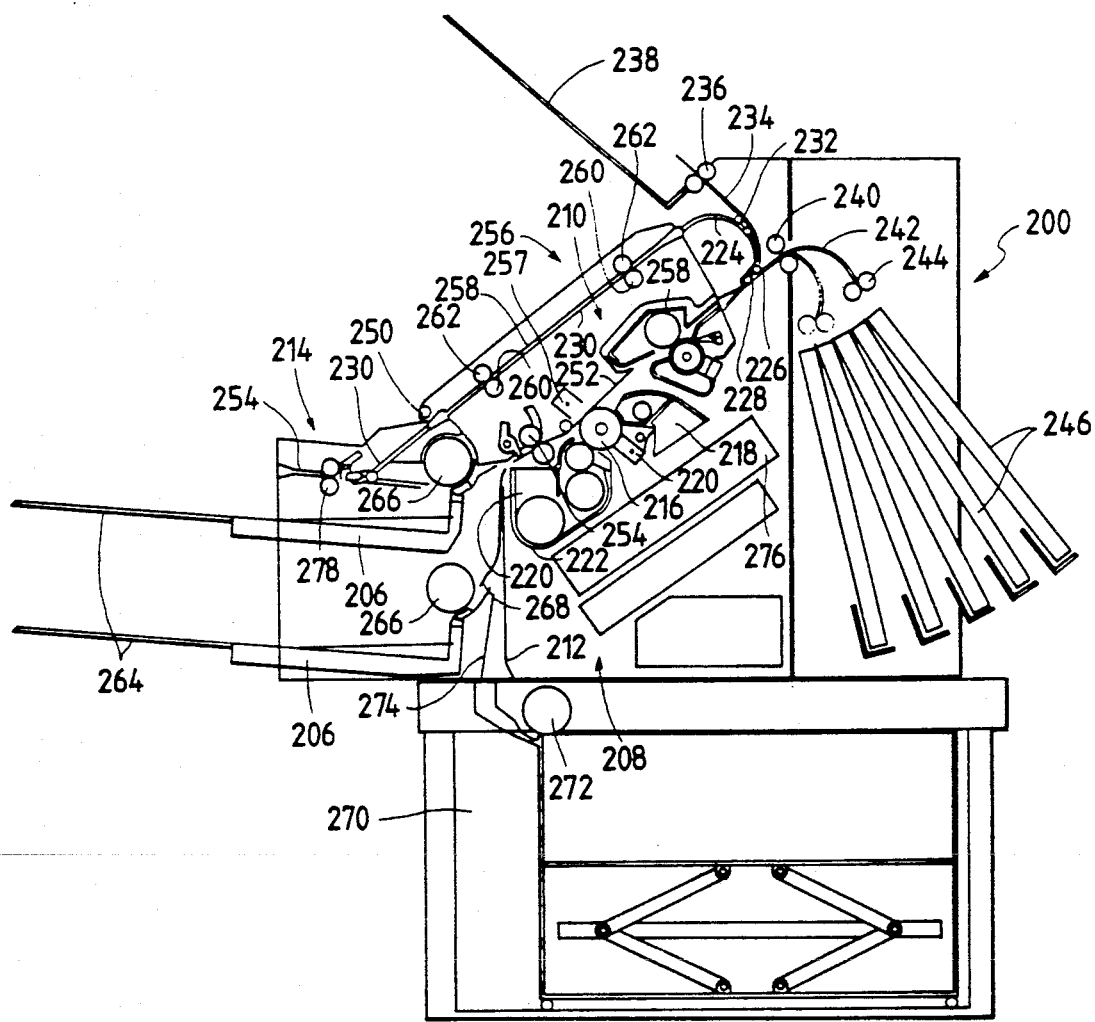
FIG. 12 is a sectional view showing the structure of the apparatus shown in FIG. 11.

In FIG. 12, reference numeral 276 designates a laser writing unit provided within the lower unit 208. Sheet feed rollers 278 are provided on the switchback type sheet forwarding mechanism 254.

Under the normal recording operation in this embodiment, the upper surface of the obliquely opened lower unit 208 is covered by the upper unit 210, and, the opened upper surface of the upper unit 210 is covered by the sheet guide member 256, as shown in FIG. 12. The operation panel 202 located on the sheet guide member 256 is sloped on the front of the apparatus body 200 for easy operator handling (FIG. 11).

Therefore, under normal conditions, when the operator selects a desired recording mode and presses the start button by operating the on the operation panel 202. The sheet in the sheet feed cassette 264 which is loaded in front of the apparatus body 200 in a manner similar to the conventional electrophotographic recording apparatus, is forwarded into the sheet forwarding path synchronously with the writing operation. The sheet is then subjected to the transfer and fixing operations and is further forwarded through the guide board 234. It is then passed through the bifurcated sheet inverting U-shaped guide board 224 to be discharged to the discharge tray 238 located in the upper portion of the apparatus body 200. When the printed sheet must be sorted, the sheet is discharged from the sorting discharge guide board 226 into either one of the sorting trays 246 selected through the discharge rollers 244 on the previously angled sorting arm 242. When the sheet is to be printed on both sides, the sheet inverted by the U-shaped guide board 224 is introduced into the switchback type sheet forwarding mechanism 254 through the inverted sheet forwarding guide board 230 placed on the upper surface of the upper unit 210. The sheet is then further advanced into the sheet forwarding path from this forwarding mechanism 254 in order to print on the rear side of the sheet.

Figure 13:
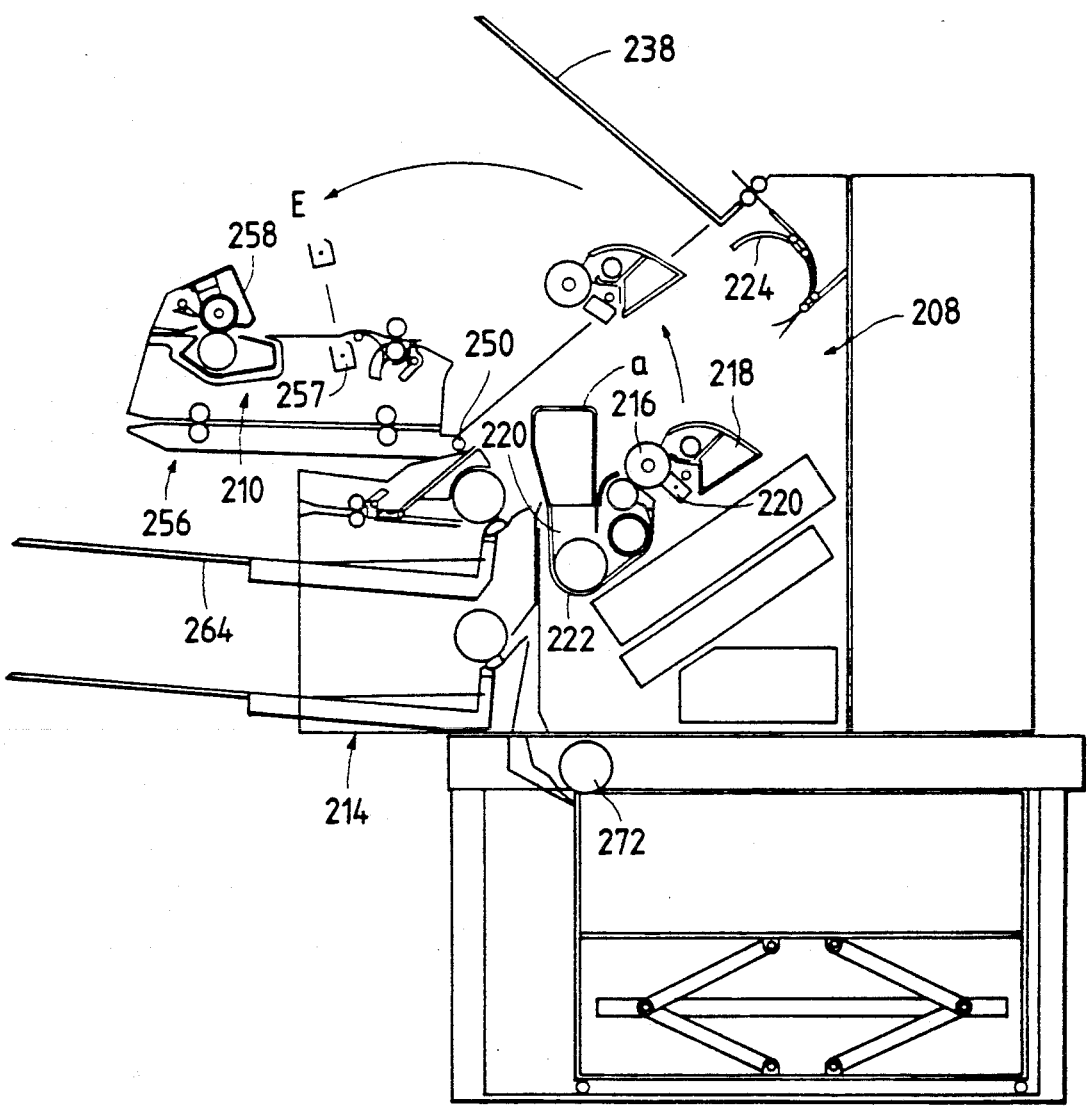
FIGS. 13 through 15 are diagrams showing how a paper jam is corrected at various stages in the printing process for the apparatus shown in FIG. 11, respectively.
Figure 14:
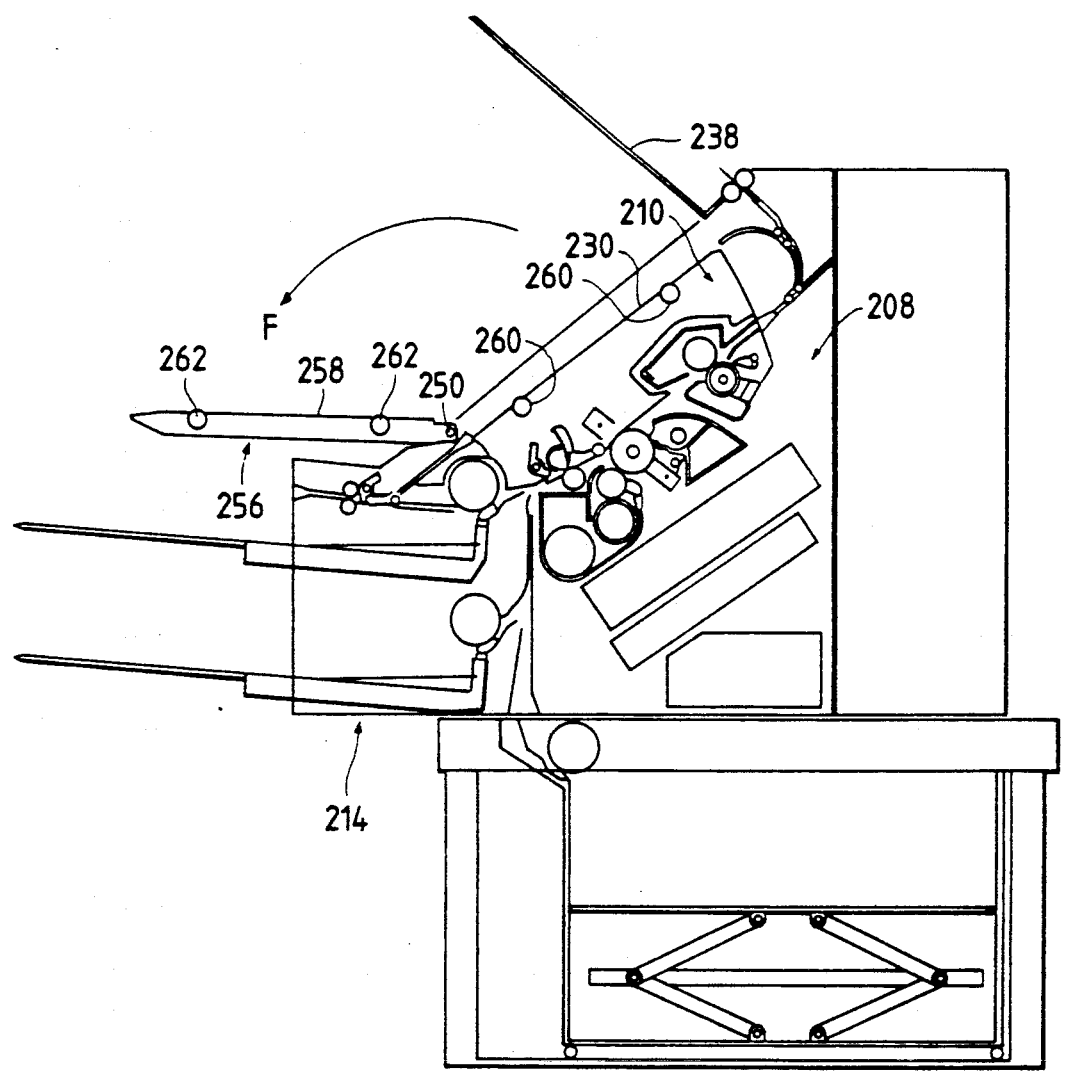
Figure 15:
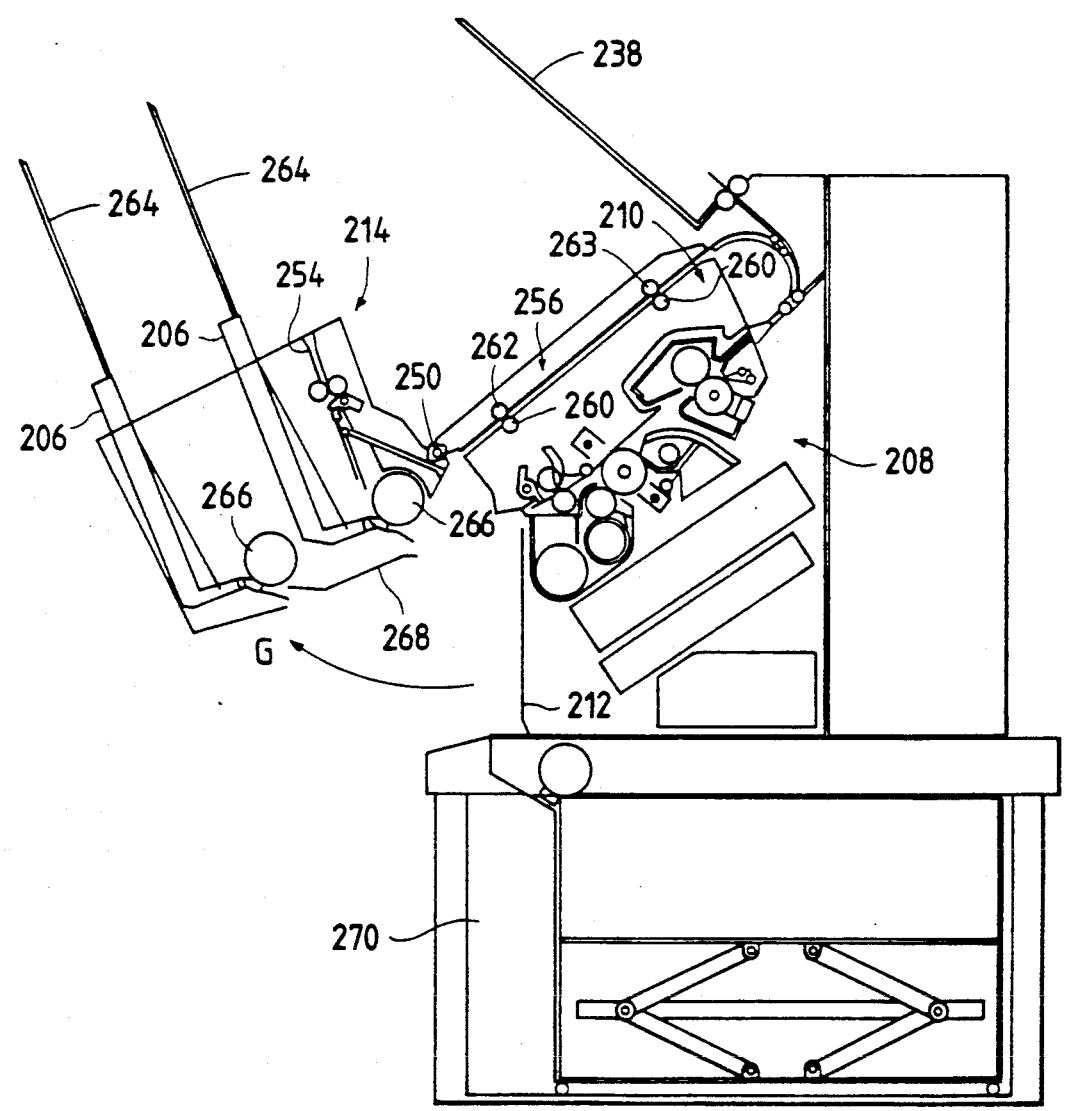

If the sheet is jammed on its way through the sheet forwarding path during recording, the upper unit 210 is pulled in the direction of the arrow E with the common shaft 250 provided on the lower unit 208 to thereby invert the upper unit 210 and expose the sheet forwarding path as shown in FIG. 13. The jammed sheet can then be removed. If the sheet is jammed on its way through the inverted sheet forwarding guide board 230 at the time of double-side printing, the sheet guide member 256 is pulled in the direction of the arrow F to invert itself with the common shaft 250 as a pivot, thereby opening the surface of the inverted sheet forwarding path on the upper unit 210 as shown in FIG. 14. The jammed sheet can then be removed. If the sheet is jammed along the sheet feed path, the sheet feed unit 214 is rotated clockwise as indicated by the arrow G in FIG. 15, with the common shaft 250 as a pivot thereby exposing the sheet feed surface. The jammed sheet can then be removed.

In this apparatus, the opening of the upper unit 210 allows the electrophotographic process unit to be opened concurrently. Therefore, in replenishing the toner, as shown in FIG. 13, a toner bottle (a) is inserted into the opening of the toner hopper 220 which is facing the sheet forwarding path to thereby allow the toner to be supplied to the developing unit 222. In inspecting the photosensitive drum 216, the cleaning unit 218, or the charger 220, the unit integrating these components can be removed from the lower unit 208 as shown in FIG. 13. In order to inspect the transfer charger 257 and the fixing unit 258, the upper unit 210 is inverted almost 180° to position itself on the sheet feed cassette 264. This easily allows for the inspection of these components.

Figure 16:
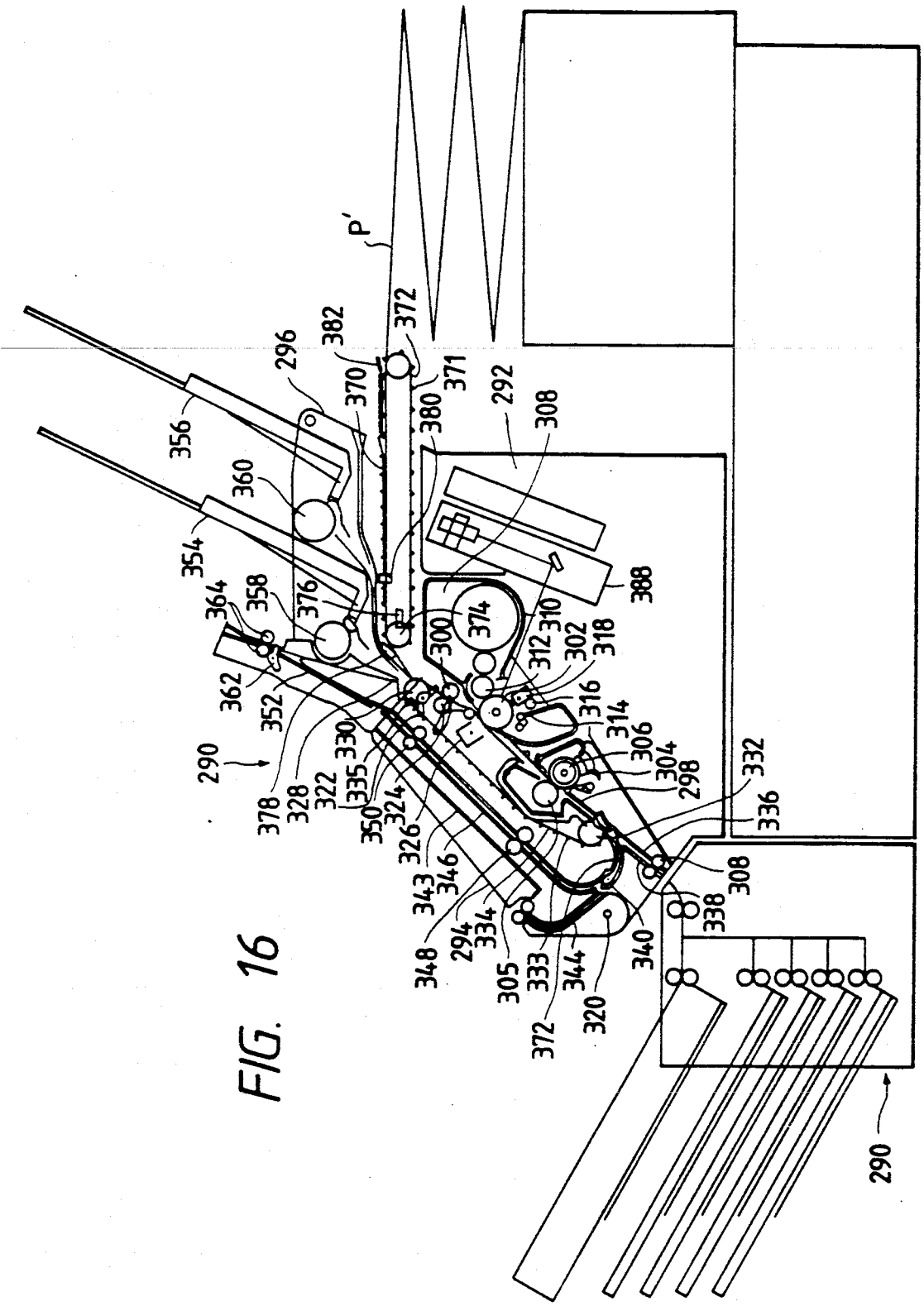
FIG. 16 is a sectional view showing a third embodiment of the electrophotographic recording apparatus according to the present invention.

FIG. 16 shows a third embodiment of the electrophotographic recording apparatus according to the present invention. This embodiment is suitable when large amounts of printing with a continuous sheet is required.

In the figure, reference numeral 290 designates an electrophotographic recording apparatus body, which can roughly be divided into a lower unit 292, an upper unit 294, and a stacker 296 for supplying cut sheets.

At the boundary between the lower unit 292 and the upper unit 294, a printing path 298 formed. On the lower unit 292 are gate rollers 300 a photosensitive drum 302, a roller 306 forming a fixing unit 304, and sheet discharge rollers 308 which are vertically aligned such that they face the printing path 298. Around the photosensitive drum 302 are: a developing unit 310 equipped with a toner hopper 308 and a developing sleeve 321, a toner recovery unit 314, an eraser unit 316, and a charging unit 318.

On the other hand, the upper unit 294 is pivotably mounted on the lower unit 292. On the surface of the lower unit 292 are connected a sheet detector 322, the roller 324 forming the resist rollers, a transfer unit 326, and the roller 305 which forms the fixing unit 304 from top downward. Between the sheet feed inlet 328, used for receiving the sheet from the stacker (described later), and the discharge outlet of the fixing unit 304 is a first tractor feeder 334 arranged at an interval corresponding to the sheet width in the sheet forwarding direction. The tractor feeder, stretched by rollers 330 and 332, serves to forward the sheet by inserting pins 333 into holes provided on both side edges of the sheet. One of the rollers 330 has a sensor 335 for detecting the phase of the first tractor feeder 334 (i.e., the position of the pins 333).

On the end portion of the first tractor feeder 334 are a first guide board 338 connected to the sheet discharge rollers 308 which is bifurcated from a first gate member 336 and a second guide board 342 connected to a second gate member 340. At the tip of the second gate member 340 are a third guide board 344 connected to a sheet tray 343 containing sheets faceup and a fourth guide board 346 for forwarding the inverted sheet for double-side printing. The fourth guide board 346 is provided with two pairs of sheet forwarding rollers 348, 350 at a predetermined interval, and the upper end of the fourth guide board 346 is connected to a guide board 352 for the stacker 296.

The stacker 296 is mounted so that a second tractor feeder (described later) can be accommodated between itself and the lower unit 292 of the electrophotographic recording apparatus body 200. The stacker 296 is further equipped with cassettes 354, 356 releasably mounted to contain cut sheets in a substantially vertical position. The sheet is taken out from pickup rollers 358 or 360 with which the tail end of the sheet comes in contact and is forwarded to the sheet feed inlet 328.

In the front of the stacker 296 is a guide board 352 for guiding the sheet in a substantially vertical manner. The tip of the guide board 352 is provided with a tail end detector 362 for detecting the tail end of the sheet; on the detector 362 are rollers 364 used for introducing the sheet to the sheet feed inlet 328 from the tail end by the switchback system.

Figure 17:
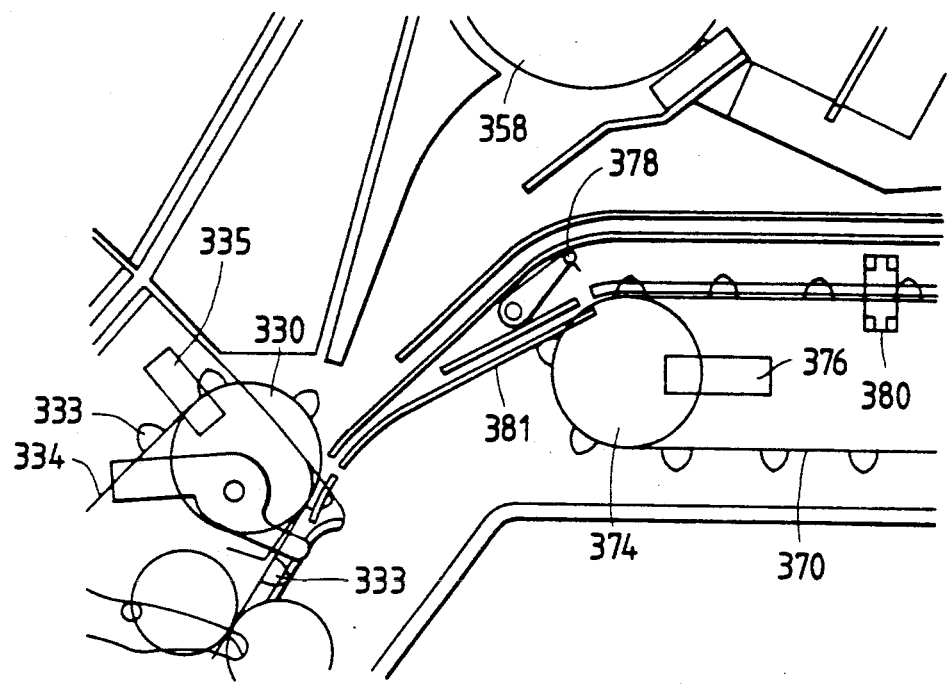
FIG. 17 is an enlarged sectional view showing the structure and location of a first and a second tractor feeder in the apparatus shown in FIG. 16.

In FIG. 16, the second tractor feeder 370 used for forwarding the sheet with pins 371 is arranged so as to be stretched by the rollers 372, 374 between the upper surface of lower unit 292 and the bottom surface of the stacker 296. The second tractor feeder 370 extends toward the front from the rear of the lower unit 292 and it is in parallel with the lower unit 292 with an interval corresponding to the sheet width. One of the rollers 374 has a sensor 376 for detecting its rotational position and in cooperation with the sensor 335 of the first tractor feeder 334, detects the positional relationship between the pins 333 and 371 of the two tractor feeders 334, 371. On the tip of the second tractor feeder 370 (i.e., on the sheet feed inlet 328 side) is a cutter 378 for cutting the continuous sheet, as shown in FIG. 17. At a predetermined distance away from the cutter 378 is a head end detector 380 for detecting the head end of the sheet.

FIG. 17 also shows the relationship between the first tractor feeder 334 and the second tractor feeder 370. Between the discharge end of the second tractor feeder 370 and the charge end of the first tractor feeder 334 are guide boards 381 and 382 (FIG. 16). The lower guide board 381 is pivotable downward around the end portion of the second tractor feeder 370 to thereby properly deliver the head end of the sheet to the first tractor feeder 334. In FIG. 16, reference numeral 388 designates an optical writing unit.

In order to print on a cut sheet with this embodiment, the continuous sheet is evacuated toward the second tractor feeder 370 side rather than the sheet feed inlet 328, and the first and second tractor feeders 334, 370 must be stopped prior to operating the stacker 296. After such preparation, the sheet taken out by the pickup rollers 358 or 360 and enters the sheet feed inlet 328 and is stopped by the gate rollers 300, 324. Upon detection of the setup of the sheet by the sheet detector 322, the sheet is forwarded to the photosensitive drum 302 by the gate rollers 300, 324, subjected to the above-described printing process, and discharged from the fixing unit 304. At this time, if the first gate member 336 is opened toward the first guide board 338, the sheet is forwarded from the sheet discharge roller 308 out into the apparatus body. If a sorter 290 is connected, the sheet enters the sorter to be thereby sorted by page.

If the first gate member 336 and the second gate member 340 are opened toward the sheet tray 343, the sheet is accommodated in the tray 343 with the printed side facing upward.

In order to print on the rear side of the sheet, the second gate member 340 is opened toward the fourth guide board 346, the sheet is first taken out into the upper end of the guide board 352 in the stacker 296, then switched back, and caused to enter the sheet feed inlet 328 beginning with the tail end. Thus, the sheet is moving through the printing path 298 with the printed side facing upward to be thereby subjected to the above-described printing process for rear-side printing.

The printing with the continuous sheet will next be described.

The head end of the continuous sheet P; which is folded at the perforations is inserted into the pins 371, and fixed by a pressing member 382.

By operating the apparatus under this condition, the sheet P' is forwarded in the direction of the sheet feed inlet 328 and its head end is detected by the head end detector 380.

When the sheet P' is further forwarded between the head end detector 380 and the first tractor feeder 334, the head end of the sheet P' output from the second tractor feeder 370 enters the inlet of the first tractor feeder 334 while guided by the guide board 381. The forwarding operation of the second tractor feeder 370 is adjusted based on signals from the detectors 335 and 376 so that the holes of the sheet coincide with the pins 333, of the first tractor feeder 334. As the sheet is introduced from the second tractor feeder 370 in this way, the first tractor feeder 334 causes the pins 333, to be inserted into the holes of the head end of the sheet for smooth receipt of the sheet. The first and second tractor feeders 334, 370 are operated in synchronism so that, the sheet is forwarded and reaches the gate rollers 300, 324 accurately positioned by the tractor feeders 334, 370 without receiving any undesired force, and the sheet P' is then detected by the sheet detector 322. At this point, the gate rollers 300, 324 are operated in synchronism with the speed of movement of the tractor feeders 334, 370; or the sheet is moved at a printing speed by the tractor feeders 334, 370 with the gate rollers 300, 324 being idle. Accordingly, the printing process as described above will be performed.

Figure 18:
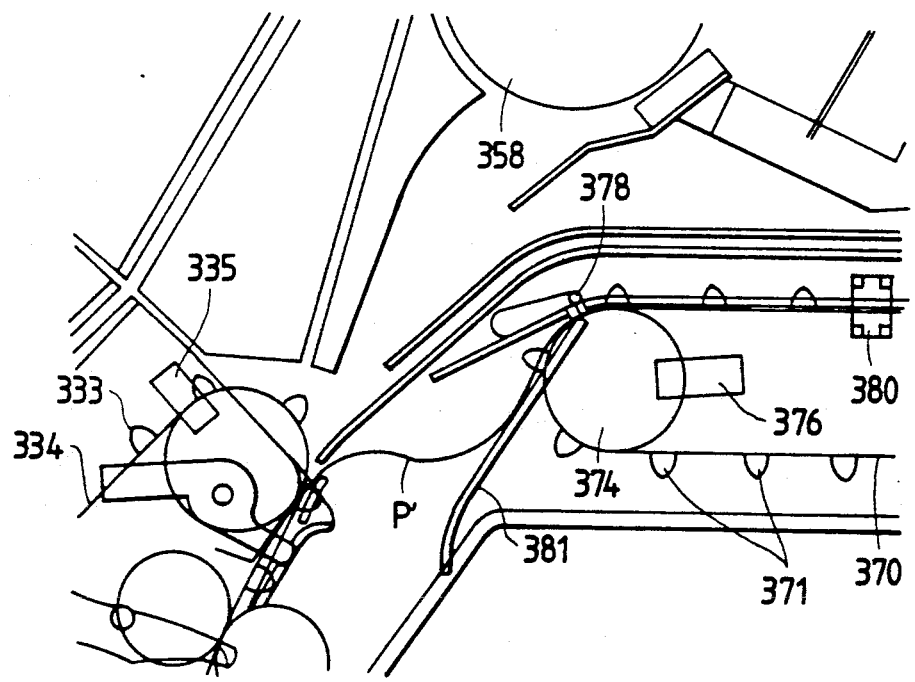
FIG. 18 is a sectional view showing the state of cutting the sheet in the apparatus shown in FIG. 16.

When a first line of perforations reaches a predetermined region from the cutter 378, the second tractor feeder 370 is accelerated while causing the first tractor feeder 334 to continuously maintain the printing speed. At the same time, the tip of the guide board 381 is turned downward. This causes the sheet P' present between the first tractor feeder 334 and the second tractor feeder 370 to be slack as shown in FIG. 18. Under this condition, the first tractor feeder 334 is causing the continuous sheet to move at the same printing speed until the line of perforations reaches the cutting position. When the line of perforations reaches the cutting position, the second tractor feeder 370 is stopped and the cutter 378 is operated. Thus, the sheet is cut at the perforations whereas its head end is forwarded by the first tractor feeder 334. After the sheet has been cut, the guide board 380 is returned to the initial position to get ready for delivery of another sheet.

In the meantime, the sheet cut by the cutter is held by the first tractor feeder 334 at both sides and forwarded; printing is continuously performed for the remaining copies.

When the printing for one page has been completed in this way, the printed sheet is discharged at a position determined either by the first or second gate members 336, 340 as described previously.

In order to print the second page, the head end of the continuous sheet is delivered to the first tractor feeder 334 while the first and second tractor feeders 334, 370 are rotated in synchronization, and the previous printing process is repeated.

Figure 19:
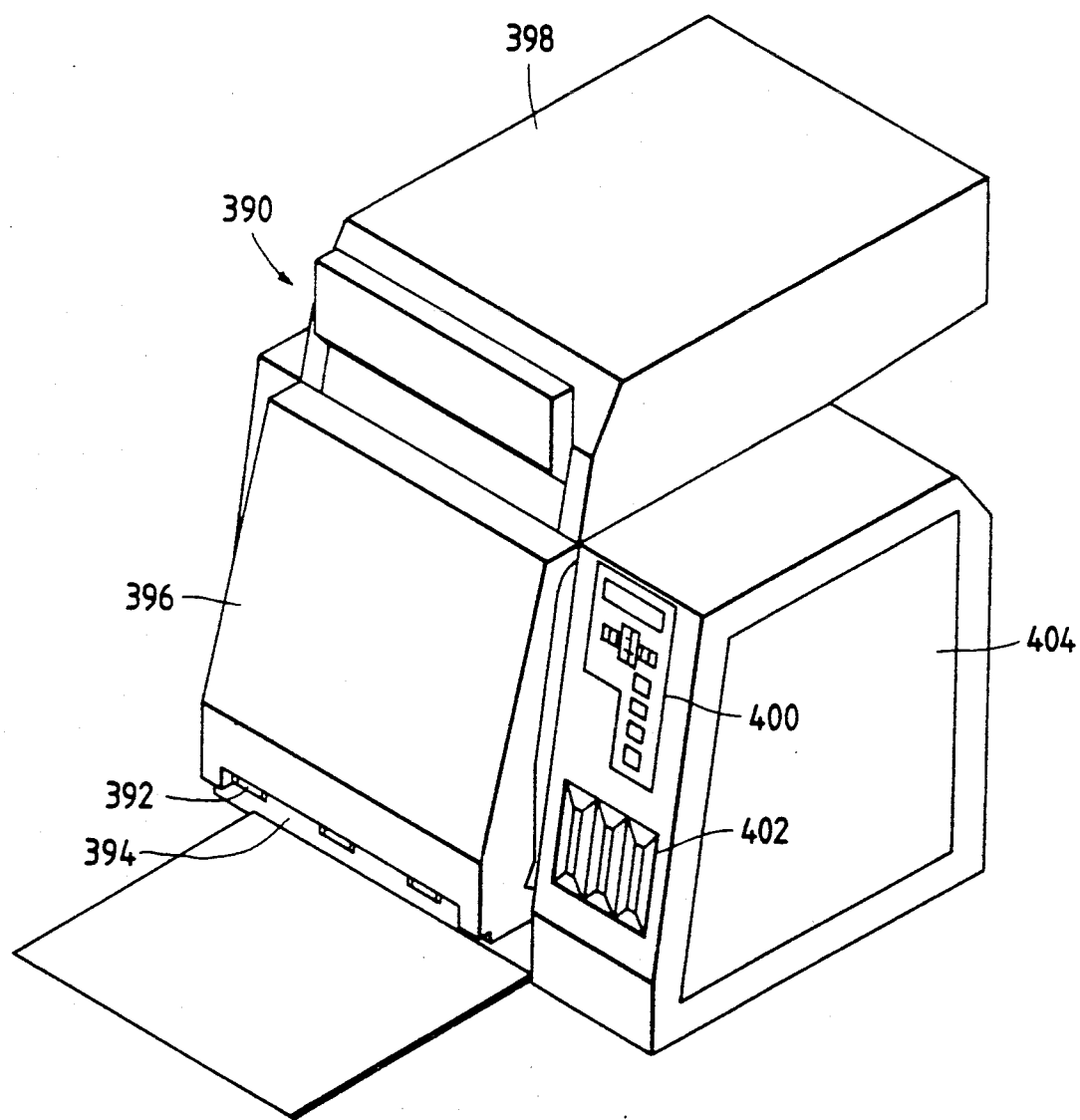
FIG. 19 is a perspective view showing a fourth embodiment of the electrophotographic recording apparatus according to the present invention.

FIG. 19 shows a fourth embodiment of the present invention in which reference numeral 390 designates an electrophotographic recording apparatus body, which comprises, at the lower portion of the front side thereof when installed, a sheet discharge outlet 394 for discharging a sheet from sheet discharge rollers 393, and a cover member 396 that stretches over the sheet discharge outlet 394 and can be freely opened and closed by a hinge. On the top of the apparatus body 390 is a cartridge type sheet feeder 398 for containing sheets in horizontal position. Next to the apparatus body 390 is a housing 404 that contains a control circuit board and an external storage medium reading unit. Housing 404 also has a control panel 400 consisting of operation switches and an external storage medium inserting inlet 402 on the front thereof.

Figure 20:
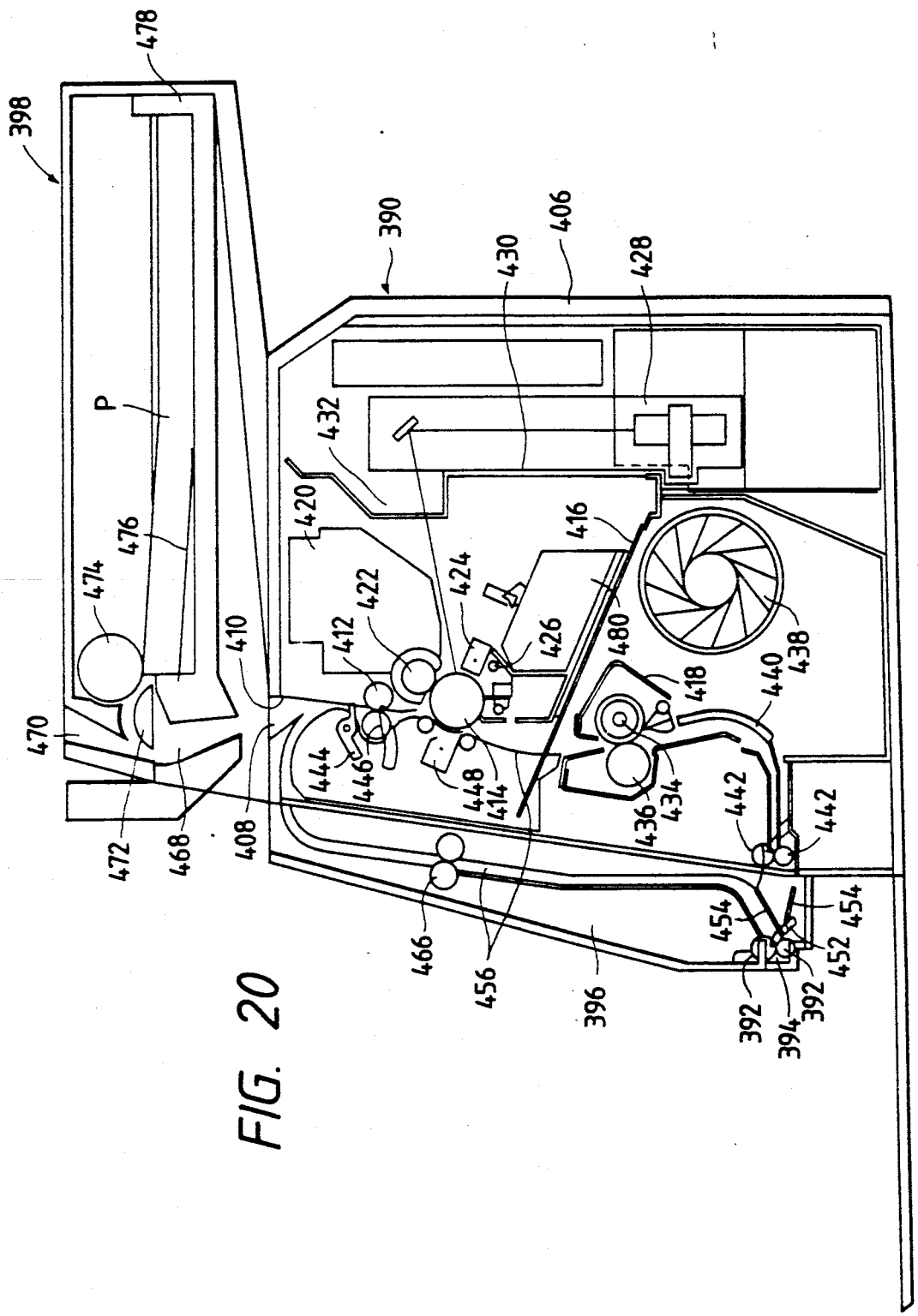
FIG. 20 is a sectional view showing the structure of the apparatus shown in FIG. 19.

FIG. 20 shows the internal structure of the apparatus shown in FIG. 19. In the front of the housing of the apparatus body 390 (left of the figure) is a sheet guide board 410 in line with a sheet receiving inlet 408 whose upper end is widened. Lined up from the top downward, in order, are: a gate roller 412, a photosensitive drum 414, shield board 416 (described later), and a fixing unit 418.

A magnetic brush on the surface of a magnetic sleeve 422 is in contact with the surface of the photosensitive drum 414. A charging unit 424 is arranged at a predetermined distance in the circumferential direction with respect to the bottom of the container of the developing unit 420. Upstream in the direction of rotation of the charging unit 424 is a discharging unit 426.

Reference numeral 428 designates an optical writing unit, disposed in the rear space isolated by a partition wall 430. An optical beam from this unit is irradiated onto the surface of the photosensitive drum 414 through a window 432 of the partition 430 and a clearance formed between the developing unit 420 and the discharging unit 424 by an optical system. The lower portion of the photosensitive drum 414 is sloped from front to rear, and divides the housing body space into two portions, an upper portion and a lower portion, by arranging the shield board 416 integrally formed with the partition wall 430 on the back. In a space below the shield board 416 are a fixing unit 418, consisting of a heating roller 434 and a pressure roller 436, and an exhaust fan 438.

On the discharge side of the fixing unit 434 is a sheet guide 440 to thereby form a sheet forwarding path for forwarding the vertical sheet to a sheet discharge outlet 394 through sheet discharge rollers 442.

Inside the cover member 396 are from top downward a sheet detector 444, a pinch roller 446 abutted against the gate roller 412, a transfer unit 448 confronting the photosensitive drum 414, and a guide member 450 stretching from the photosensitive drum 414 to the fixing unit 418.

Upstream of the discharge roller 392 are a tail end detector 452 and a pivotably arranged sheet forwarding path selecting board 454. In the case of double-side printing, the sheet is forwarded to a sheet inverting path 456.

In the FIG. 20, reference numeral 456 designates the sheet inverting path formed on the cover member 396. The sheet inverting path 456 is connected to the sheet feed inlet 408 upstream of the sheet discharge roller 392 interposing a roller 466 for forwarding the sheet upward.

Reference numeral 398 designates the sheet feeder, which is movable on the electrophotographic recording apparatus body 390 toward or away from the apparatus. The sheet feeder 398 is set to a sheet feed position (the position indicated in FIG. 19) and is removable by pulling toward the front. At the lower front portion of the feeder body is a sheet discharge outlet 468 formed so that it confronts the sheet feed inlet 408 of the electrophotographic recording apparatus body vertically. Above this outlet is a sheet feed inlet 470 opened for manual insertion. The sheet discharge outlet 468 is provided with not only a guide member 472 that is winglike in cross-section for inverting the sheet direction by causing the horizontally forwarded sheet to be bent vertically downward, but also a pickup roller 474 positioned to contact the head end of the sheet. Reference numeral 476 designates a spring disposed on the bottom portion of a cassette 478 for pressing the head end of the sheet on the pickup roller 474.

In this embodiment, when the cassette 478, having the sheet P therein contained, is set to the sheet feeder 398, the sheet is held horizontally with the bottom of the cassette being pushed up by the spring and the top thereof being pressed by the pickup roller 474.

Under this condition, the printing starts when a sheet is taken out from the cassette 478 by the pickup roller 474. The head end of the sheet is bent vertically downward to be thereby directed toward the sheet discharge outlet 468. The sheet enters the sheet feed inlet 408 of the electrophotographic recording apparatus body 390 and is abutted against the gate roller 412 by the sheet guide board 410. When the sheet is further pressed down by the pickup roller 474 under this condition, a signal is produced from the sheet detector 444.

Thus, the gate roller 412 is rotated to set the sheet to a reference position, and the sheet is forwarded further downward. The transfer unit 448 transfers a toner image formed on the photosensitive drum 414 onto the sheet. The fixing unit 418 fixes the toner on the sheet, and the sheet is further forwarded to the sheet discharge rollers 442.

The waste heat of the fixing unit 418 during this process is stopped from going upward by the shield board 416 and is quickly discharged by the exhaust fan 438 to the outside.

The toner not that has adhered to the photosensitive drum 414 but has not been transferred to the sheet during the developing process is scratched off by a blade located substantially below the photosensitive drum 414 and is received by its own weight in a waste toner tank 480 located right below.

In order to print on the rear side of the sheet as well, the gate member 454 is switched to the sheet inversion path 456 and the sheet discharge rollers 392 are reversely rotated to thereby pull the sheet into the apparatus body side with the tail end being bit by the sheet discharge rollers 392. The tail end of the sheet is guided to the sheet inversion path 456 by the gate member 454 then forwarded through the sheet inversion path 456 and is stopped by the gate roller 446 by entering the sheet feed inlet 408 again. Under this condition, the rear side of the sheet faces the photosensitive drum 414 so that rear-side printing is performed by following the same process as described above.

In the case where a small number of copies are to be made using sheets not set in the cassette 478, the sheet is inserted into the manual insertion sheet feed inlet 470. The sheet is then guided to the sheet discharge outlet 468 by the guide member 472 and reaches the gate roller 412 by passing through the sheet feed inlet 408. As the sheet is further pushed, a signal is produced by the sheet detector 444 to thereby operate the gate roller 412. It is at this time when the hand is released. Then, printing is performed by the same process as described above.

What is claimed is:

1. An electrophotographic recording apparatus, comprising:
   means for inletting a sheet into which a recording sheet is inserted;
   means for feeding said recording sheet to said sheet inlet means;
   means, having a photosensitive drum, for forming a printing image on said photosensitive drum based on printing data and for transferring said printing image onto said recording sheet;

means for fixing said transferred printing image on said recording sheet;

discharge roller means arranged downstream of said fixing means for discharging and recording sheet which has been printed;

means for switching the direction of feeding said recording sheet supplied from said fixing means in first and second directions;

means for guiding said recording sheet having a portion thereof which is connected to said switching means when said switching means switches the sheet feeding direction in said first direction, and an outlet thereof which is located above said sheet inlet means;

means for detecting a tail end of said recording sheet, said detecting means being arranged on an end portion of said sheet guide means;

sheet take-out roller means, located downstream of said detection means, for forwarding said recording sheet, which is fed through said sheet guide means upward and downward by reverse rotation according to an output signal from said detecting means;

a fixed sheet forwarding path switching member having a substantially triangular cross-section, positioned with an apex thereof adjacent to both said sheet takeout roller means and said detecting means and configured such that when the sheet direction is reversed by the reverse rotation of said sheet takeout means, the sheet is prevented from entering the upward sheet guide path; and reading means for writing said printing data from a last line onward to said photosensitive drum when rear-side printing is performed.

2. An apparatus as claimed in claim 1, wherein said sheet guide means is provided with a plurality of projecting members extending in the sheet forwarding direction, said plurality of projecting members confronting with each other staggeredly.

3. An apparatus as claimed in claim 1, wherein an oblique line of said sheet forwarding path switching member is provided with a guide board so as to provide a clearance for said sheet to pass through and a direction in which said sheet take-out roller means are pulled is set so that it intersects said guide board on a downward side of a printing path.

4. An apparatus as claimed in claim 1, wherein said apex of said sheet forwarding path switching member is cut so that it can guide said sheet into said printing path and is opened wider to accept a downward moving sheet after reversal by said sheet takeout roller means.

5. An apparatus as claimed in claim 1, further comprising:

sorter forwarding rollers provided so as to coincide with said discharge roller means; and sorting unit for sorting said sheet discharged from said discharge roller means into upper and lower directions.

* * * * *